United States Patent
Bertot et al.

(10) Patent No.: US 8,433,615 B2
(45) Date of Patent: Apr. 30, 2013

(54) FACILITATING MULTI-PHASE ELECTRONIC BID EVALUATION

(75) Inventors: German Bertot, Redwood City, CA (US); Manish Srivastava, Cary, NC (US); Shankar Viswanathan, Secunderabad (IN); Sanjay Singh Thakur, Fremont, CA (US); Saurabh Dewan, Noida (IN); Udaykumar Kottamasu, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 992 days.

(21) Appl. No.: 12/025,774

(22) Filed: Feb. 5, 2008

(65) Prior Publication Data

US 2009/0198609 A1    Aug. 6, 2009

(51) Int. Cl.
*G06Q 30/00* (2006.01)
*G06F 17/30* (2006.01)

(52) U.S. Cl.
USPC ................. 705/26.1; 705/26.3; 705/27.1

(58) Field of Classification Search .......... 705/26–27, 705/26.1–27.2
See application file for complete search history.

(56) References Cited

U.S. PATENT DOCUMENTS

| | | | | |
|---|---|---|---|---|
| 6,006,194 | A * | 12/1999 | Merel | 705/8 |
| 7,200,564 | B2 * | 4/2007 | Eichstaedt et al. | 705/8 |
| 7,409,360 | B1 * | 8/2008 | Lark et al. | 705/26 |
| 7,409,361 | B2 * | 8/2008 | Dinwoodie | 705/26 |
| 2002/0038285 | A1 * | 3/2002 | Golden et al. | 705/38 |
| 2003/0088494 | A1 * | 5/2003 | Lee | 705/37 |
| 2004/0215467 | A1 * | 10/2004 | Coffman et al. | 705/1 |
| 2005/0055299 | A1 * | 3/2005 | Chambers et al. | 705/36 |
| 2005/0234811 | A1 * | 10/2005 | Herman et al. | 705/37 |
| 2006/0136324 | A1 * | 6/2006 | Barry et al. | 705/37 |
| 2006/0173775 | A1 * | 8/2006 | Cullen et al. | 705/37 |
| 2008/0091587 | A1 * | 4/2008 | DeLaCruz | 705/37 |
| 2008/0162330 | A1 * | 7/2008 | Atkinson et al. | 705/37 |
| 2009/0024487 | A1 * | 1/2009 | Mehregany | 705/26 |
| 2009/0030829 | A1 * | 1/2009 | Chatter et al. | 705/37 |
| 2009/0182577 | A1 * | 7/2009 | Squilla et al. | 705/2 |

OTHER PUBLICATIONS

"India Reforms Acquisition Process and Speeds up Modernisation". Military Technology. Feb. 2004. vol. 28, Iss. 2; p. 16, 7 pgs [recovered from ProQuest on Jun. 22, 2010].*

* cited by examiner

*Primary Examiner* — Peter Choi
*Assistant Examiner* — Kathleen G Palavecino
(74) *Attorney, Agent, or Firm* — Narendra Reddy Thappeta

(57) ABSTRACT

A computer implemented approach to facilitate multi-phase bid evaluation. In one embodiment, a digital processing system receives information packets (corresponding to bids) from different suppliers containing information elements associated with one of a sequence of phases. On receiving an indication (from a buyer) that a specific phase of the bidding is to be evaluated starting at a time instance, the system allows the buyer access of elements associated with the specific phase only after the time instance, while allowing access to elements associated with a previous phase (occurring prior to the specific phase in the sequence of phases) even before the time instance. In a scenario where the suppliers who have successfully qualified in the previous phase are received, the system allows access of elements associated with the specific phase corresponding only to the qualified suppliers in response to the indication.

23 Claims, 29 Drawing Sheets

Requirements

Display Scoring Criteria to Suppliers: No  (Select Scoring Settings)

Select Requirement: (Add Section) (Add Requirement) (Move) (Delete)   Actions [Equalize Weights ▼] (Go)

| Select | Title | RFQ Stage | Type | Target | Weight | Maximum Score | Update |
|---|---|---|---|---|---|---|---|
| ☐ | ⊟ Requirements | | | | | | |
| ☐ | ⊟ Building Requirements | Engineering | | | | | |
| ☐ | STANDARD FOUNDATIONS Please provide the Foundation Specifications.<br>• FLOORS ON GRADE<br>• BASEMENTS<br>• BASEMENT EXCAVATION<br>• BASEMENT WALLS | | Required | | 5 | 100 | ✎ |
| ☐ | SUPERSTRUCTURE SPECIFICATION<br>• ELEVATED FLOORS<br>• ROOFS | | Required | | 5 | 100 | ✎ |
| ☐ | EXTERIOR WALLS SPECIFICATIONS<br>• EXTERIOR WINDOWS AND OTHER OPENINGS<br>• EXTEROIR DOORS | | Required | | 5 | 100 | ✎ |
| ☐ | ROOFING SPECIFICATIONS<br>• ROOF COVERINGS | | Required | | 5 | 100 | ✎ |

FIG. 3B

| | 372 | 373 | 374 | 375 | 376 | 377 | 378 |
|---|---|---|---|---|---|---|---|
| 371 | | | | | | | |
| 386 → ☐ | ⊡ MAXIMUM ALLOWED DESIGN AND CONSTRUCTION COST | Financial | | | | | ✎ |
| 387 → ☐ | Best and Final Proposals may not exceed the maximum Allowable Design and Construction Cost (MADCC) of $12,667,000.00, excluding State Sales Tax.<br><br>Provide details of cost here if your proposal exceeds this amount. | | Optional | | | | ✎ |
| 388 → ☐ | ⊡ SCHEDULE | Financial | | | | | ✎ |
| 389 → ☐ | Provide the schedule of deliverables here detailing each milestone and the expected amount to be paid at each milestone | | Required | | 25 | 100 | ✎ |

Select Requirement: (Add Section) (Add Requirement) (Move) (Delete)   Actions [Equalize Weights ▼] (Go) — 395

FIG. 3C

Sourcing Application

Negotiations

→ Create RFQ 106676: Lines — 420

410

Cancel  Save as Draft  Review — 415, 418

Display Rank As  1,2,3...
Ranking  Price Only

Cost Factors  Buyer & Supplier ▶
☑ Suppliers see their quote price transformed
Price Tiers  None ▶

450

455

Select Lines:  Move  Delete  Actions  Create Line ▶  Go

| Select | Line | Item, Rev | Category | Unit | Quantity | Add Line | Requisition | Update | Delete |
|---|---|---|---|---|---|---|---|---|---|
| ☐ | 1 Educational Outreach Building | | | | | | | | |
| ☐ | 1.1 Demolition Cost | | MISC.MISC | Each | 1 | | | ✎ | ✕ |
| ☐ | 1.2 Site Work - Site Preparation | | MISC.MISC | Each | 1 | | | ✎ | ✕ |
| ☐ | 1.3 Construction - Foundation | | MISC.MISC | Each | 1 | | | ✎ | ✕ |
| ☐ | 1.4 Construction - Shell | | MISC.MISC | Each | 1 | | | ✎ | ✕ |
| ☐ | 1.5 Construction - Interior | | MISC.MISC | Each | 1 | ⌂ | | ✎ | ✕ |
| ☐ | 1.6 Infrastructure and Services | | MISC.MISC | Each | 1 | | | ✎ | ✕ |
| ☐ | 1.7 Telecommunication & Others | | MISC.MISC | Each | 1 | | | ✎ | ✕ |

Cost Factors

Line Target Price [      ]

☐ Display to Suppliers (Add Cost Factor List)

| Cost Factor | Description | Type | Pricing Basis | Display To Suppliers | Target Value | Display Target | Delete |
|---|---|---|---|---|---|---|---|
| Administration Fee A3 | Administration Fee Description | Buyer ▼ | Fixed Amount ▼ | ✓ | | | ✗ |
| INSURANCE | Insurance | Supplier ▼ | % of line Price ▼ | ✓ | [    ] | ☐ | ✗ |

(Add Another Row)

Notes and Attachments

Note to Suppliers

[                                ]

(Add Attachment)

FIG. 5B

Sourcing Application

Negotiations

Create RFQ 106676: Scoring Teams — 620

☑ Enable Team Scoring — 625 (640)

| Name | Instructions | Price Visibility | Member | Delete |
|------|--------------|------------------|--------|--------|
| Assesment Team A | For evaluating Tecnical aspects of the quotes | ☐ | ✏ | ✗ |
| Assesment Team B | For evaluating Technical and Commercial aspects of the quotes | ☑ | ✏ | ✗ |

(Add Another Row)

Section Assignments — 660

| Section | Team Assignment |
|---------|-----------------|
| BUILDING REQUIREMENTS | Assesment Team A ▸ |
| DEMOLITION | Assesment Team A ▸ |
| DEMOLITION COST | Assesment Team B ▸ |
| SITE WORK | Assesment Team A ▸ |
| MAXIMUM ALLOWED DESIGN AND CONSTRUCTION COST | Assesment Team B ▸ |
| SCHEDULE | Assesment Team B ▸ |

(Cancel)  (Save) 680  (Apply) 685

*FIG. 6*

1. Header Information         810

1.1 General Information

Title    Educational Outreach Building

Description    The Educational Outreach Building will be an approximately 64,000 gross square feet, five-story structure with basement parking. The building will have a low slope roof with parapets. Mechanical systems will be roof mounted. The entry/lobby space will include a waiting area, access to elevators and access to program functions for visitor information, registration and computer labs. There will be a covered exterior area with canopy above. The typical floor core area will indicate (2) toilet rooms with two tiolets and lavatories each, (2) traction elebators, electrical room, mechanical distribution chase and (2) exit stairs. The basement area below the building is programmed to accommodate 28 parking stalls, with vehicle access from the alley on the east side of the site. B. The office building will be constructed on a University owned site in the southwest portion of the campus, currently utilized as a visitor's information centre, storage facilities and surface parking. For more specific information on the site and its surroundings see Campus Master Plan. For more details please see document attached detailing the specifications for the building.

| | | | |
|---|---|---|---|
| Preview Date | Immediately | Open Date | Immediately ← 830 |
| Close Date | 30-Sep-2007 00:00:00 | Award Date | Not Specified |
| Time Zone | Central Time | Buyer | Baker, Ms. Catherine |
| Quote Style | Sealed | Email | cbaker@vision.com |
| Sourcing Project | Not Specified | Outcome | Standard Purchase Order |
| | | Event | Not Specified |

850 →  *This is a Two-Stage RFQ and all response will be evaluated in two stages - Technical and Commercial.*

1.2 Terms

| | | | |
|---|---|---|---|
| Ship-To Address | M1- Seattle Mfg<br>3455 108th Avenue<br>Seattle, WA 98101<br>United States | Bill-To Address | V1- NewYork City<br>90 Fifth Avenue<br>New York, NY 10022-3422<br>United States |
| Payment Terms | 45 Net (terms date + 45) | Carrier | |
| FOB | Origin | Freight Terms | Due |
| Currency | USD (US Dollar) | Price Precision | Any |

1.3 Requirements

| Building Requirements<br>Section Weight 40 | RFQ Stage - Technical |
|---|---|
| STANDARD FOUNDATIONS - Please provide the Foundation Specifications.    880<br>• FLOORS ON GRADE<br>• BASEMENTS<br>• BASEMENT EXCAVATION<br>• BASEMENT WALLS | |
| Scoring Manual, Weight 5, Knockout Score 40 | |
| SUPERSTRUCTURE SPECIFICATION<br>• ELEVATED FLOORS<br>• ROOFS | |
| Scoring Manual, Weight 5, Knockout Score 40 | |

Sourcing Application

Negotiations

⚠ Warning
This quote is in response to an RFQ where the submitted quote will be evaluated in two stages - Technical and Commercial. — 1115

→ Create Quote 79208: (RFQ 106676) > Review and Submit — 1120

(Cancel) (Validate) (Save Draft) (Printable View) (Submit) — 1180
             1130      1135          1140

Header — 1160

Title Educational Outreach Building          Time Left 24 days 17 hours
Supplier Gingers                             Close Date 30-Sep-2007 00:00:00

RFQ Currency USD                             Quote Valid Until
Quote Currency USD                           Reference Number
Price Precision Any                          Note to Buyer

Attachments

| Title | Type | Description | Category | Last Updated by | Last Update | Usage |
|---|---|---|---|---|---|---|
| Educational Outreach Building Project Details | File | Educational Outreach Building Project Details | From Supplier: Technical | Gingers | 05-Sep-2007 | One-Time |

Sourcing Application

Negotiations

RFQ: 106676 ← 1220

| | | Actions | Unlock Stage : Technical ▼ | Go |

1250  1255

Title Educational Outreach Building

Status Closed (Locked)     Open Date 11-Sep-2007 00:00:00

Time Left 0 Seconds     Close Date 30-Sep-2007 00:00:00

1230

| Header | Lines | Controls | Contract Terms | Suppliers |

Buyer Baker, Ms. Catherine     Sourcing Project

☑ Two-Stage RFQ     Approval Status Requires No Approval

Negotiation Style Standard Negotiation     Operating Unit Vision Operations

Quote Style Sealed     Outcome Standard Purchase Order

Security Level Public     Event

Description Educational Outreach Building

1270

Collaboration Team

| Member | Position | Approver | Access | Task | Target Date | Task Completed |
|---|---|---|---|---|---|---|
| Baker, Catherine | BUY501.Buyer 1 | No | Full | | | |
| | | | | | | |
| | | | | | | |

Sourcing Application

Negotiations

ⓘ Information
Scoring has not been locked therefore manual scores are not included in the scoring.

Analyze by Quote (RFQ 106676)> Quote: 79208

| | | Actions | Online Discussions ▶ | Go |
|---|---|---|---|---|

Title Educational Outreach Building
Time Left 0 Seconds  Close Date 30-Sep-2007 00:00:00
Quote Style Sealed  Ranking Price Only
Quote Currency USD  Supplier Gingers
Contact  Supplier Site
Supplier' Quote Number  Quote Valid Until
Quote Status Active  Purchase Order
Note to Buyer  Shortlist Status Included

Attachments

| Title | Type | Description | Category | Last Updated | Usage | Update | Delete | Publish to Catalog |
|---|---|---|---|---|---|---|---|---|
| Vision Enterprises - Previous Projects Technical Details | File | Vision Enterprises - Previous Projects Technical Details | From Supplier: Technical | 11-Sep-2007 | One-Time | ✎ | ✄ | 📄 |

Requirements

| Details | Section | RFQ Stage | | | | Weight |
|---|---|---|---|---|---|---|
| ⊞ Show | Buiness | Technical | | | | 35 |
| ⊞ Show | Management | Technical | | | | 30 |
| | | Total | | | | 65 |

*FIG. 14A*

Lines

1410

| Details | Line | Start Price | Target Price | Unit | Estimated Quantity | Estimated Total Amount | Target Minimum Release Amount | Active Quotes |
|---|---|---|---|---|---|---|---|---|
| ☐ Hide | 1 Educational Outreach Building | | | | | | | 3 |

Attachments

| Title | Type | Description | Last Updated | Usage | Update | Delete | Publish to Catalog |
|---|---|---|---|---|---|---|---|
| No Results Found | | | | | | | |

| ☐ Hide | 1.1 Demolition Cost | 125,000 | | Each | 1 | | | 3 |

Attachments

| Title | Type | Description | Last Updated | Usage | Update | Delete | Publish to Catalog |
|---|---|---|---|---|---|---|---|
| No Results Found | | | | | | | |

| ☐ Hide | 1.2 Site Work - Site Preparation | 175,000 | | Each | 1 | | | 3 |

Attachments

| Title | Type | Description | Last Updated | Usage | Update | Delete | Publish to Catalog |
|---|---|---|---|---|---|---|---|
| No Results Found | | | | | | | |

| ⊞ Show | 1.3 Construction - Foundation | | 350,000 | Each | | | | 3 |
| ⊞ Show | 1.4 Construction - Shell & Interior | | 750,000 | Each | | | | Sealed |

*FIG. 14B*

Sourcing Application

Negotiations

1520 → Analyze by Quote (RFQ 106676)> Quote: 79208

1510

1551 → ⊟ Hide | DEMOLITION | | | Technical | | | | 1530

| Requirement | Target Value | Bid Value | Maximum Score | Assessment Team A | Score | Internal Note | Weight |
|---|---|---|---|---|---|---|---|
| RELOCATION OF EXISTING PEOPLE AND RESOURCES DEMOLITION STRATEGY | | RELOCATION OF EXISTING PEOPLE AND RESOURCES DEMOLITION STRATEGY | 100 | | 90 (1560) | (1570) | 10 |

1552 → ⊟ Hide | DEMOLITION COST | | | Commercial

| Requirement | Target Value | Bid Value | Maximum Score | Assessment Team B | Score | Internal Note | Weight |
|---|---|---|---|---|---|---|---|
| BREAK DOWN OF COST FOR DEMOLITION - While You Specify the Breakdown Here, the Cost of Demolition Will Explitly Be Include as a Line Item to Go Together with the Overall Cost If the Project. | | | 100 | | | | 10 |

1553 → ⊟ Hide | SITE WORK | | | Technical

| Requirement | Target Value | Bid Value | Maximum Score | Assessment Team A | Score | Internal Note | Weight |
|---|---|---|---|---|---|---|---|
| EARTHWORK<br>• SITE IMPROVEMENTS<br>• PAVEMENTS AND SURFACEING<br>• SITE FIXTURES AND EQUIPMENT<br>• LANDSCAPING<br>SERVICES<br>• WATER SUPPLY<br>• SANITARY SEWER | | EARTHWORK *SITE IMPROVEMENTS* PAVEMENTS AND SURFACEING* SITE FIXTURES AND EQUIPMENT* LANDSCAPING* SERVICES*... | 100 | | 80 | | 15 |

*FIG. 15*

Sourcing Application

Negotiations

RFQ: 106676 ← 1620

1625

| Header | Lines | Controls | Contract Terms | Suppliers |

Title Educational Outreach Building

Status Evaluation in Progress: Technical

Time Left 0 Seconds

Actions [ Complete Evaluation : Technical ▼ ] (Go) ← 1635
                                          ↑
                                        1630

Open Date 11-Sep-2007 00:00:00

Close Date 30-Sep-2007 00:00:00

Buyer Baker, Ms. Catherine

Negotiation Style ☑ Two-Stage RFQ

Quote Style Standard Negotiation

Security Level Sealed

Description Public

Description Educational Outreach Building

Sourcing Project

Approval Status Requires No Approval

Operating Unit Vision Operations

Outcome Standard Purchase Order

Event

1610

Collaboration Team

| Member | Position | Approver | Access | Task | Target Date | Task Completed |
|---|---|---|---|---|---|---|
| Baker, Catherine | BUY501.Buyer 1 | No | Full | | | |
| | | | | | | |
| | | | | | | |

*FIG. 16A*

Sourcing Application

Negotiations

RFQ: 106676

Actions [Undo Complete Evaluation : Technical ▼] (Go)

Title Educational Outreach Building

Status Evaluation Complete: Technical      Open Date 11-Sep-2007 00:00:00

Time Left 0 Seconds      Close Date 30-Sep-2007 00:00:00

| Header | Lines | Controls | Contract Terms | Suppliers |

Buyer Baker, Ms. Catherine      Sourcing Project

☑ Two-Stage RFQ      Approval Status Requires No Approval

Negotiation Style Standard Negotiation      Operating Unit Vision Operations

Quote Style Sealed      Outcome Standard Purchase Order

Security Level Public      Event

Description Educational Outreach Building

Collaboration Team

| Member | Position | Approver | Access | Task | Target Date | Task Completed |
|---|---|---|---|---|---|---|
| Baker, Catherine | BUY501.Buyer 1 | No | Full | | | |

*FIG. 16C*

Sourcing Application

Negotiations

RFQ: 106676

| | |
|---|---|
| Title | Educational Outreach Building |
| | Actions [Unlock Stage : Commercial ▼] (Go) |
| Status | Evaluation Complete: Technical |
| | Open Date 11-Sep-2007 00:00:00 |
| Time Left | 0 Seconds |
| | Close Date 30-Sep-2007 00:00:00 |

[Header] [Lines] [Controls] [Contract Terms] [Suppliers]

| | | | |
|---|---|---|---|
| Buyer | Baker, Ms. Catherine | Sourcing Project | |
| | ☑ Two-Stage RFQ | Approval Status | Requires No Approval |
| Negotiation Style | Standard Negotiation | Operating Unit | Vision Operations |
| Quote Style | Sealed | Outcome | Standard Purchase Order |
| Security Level | Public | Event | |
| Description | Educational Outreach Building | | |

Collaboration Team

| Member | Position | Approver | Access | Task | Target Date | Task Completed |
|---|---|---|---|---|---|---|
| Baker, Catherine | BUY501.Buyer 1 | No | Full | | | |

*FIG. 16D*

Sourcing Application

Negotiations

→ Analyze by Quote (RFQ 106676)> Quote: 79208

Actions [Online Discussions ▼] (Go)

Title Educational Outreach Building
Time Left 0 Seconds
Quote Style Sealed
Quote Currency USD
Contact Kim, Helen
Supplier' Quote Number
Quote Status Active
Note to Buyer Close Date 11-Sep-2007 11:48:02
Ranking Price Only
Supplier Gingers
Supplier Site
Quote Valid Until
Purchase Order
Shortlist Status Included

Attachments

| Title | Type | Description | Category | Last Updated | Usage | Update | Delete |
|---|---|---|---|---|---|---|---|
| Vision Enterprises - Previous Projects Technical Details | File | Vision Enterprises - Pervious Projects Technical Details | From Supplier: Technical | 11-Sep-2007 | One-Time | ✎ | ✕ |
| Vision Enterprises - Previous Projects Cost Details | File | Vision Enterprises - Pervious Projects Cost Details | From Supplier: Commercial | 11-Sep-2007 | One-Time | ✎ | ✕ |

Requirements

| Details | Section | RFQ Stage | Weight | Weighted Score | Publish to Catalog |
|---|---|---|---|---|---|
| ⊞ Show | Buiness | Technical | 35 | 27.25 | |
| ⊞ Show | Management | Technical | 30 | 25 | |
| ⊞ Show | Financial | Commercial | 35 | 29 | |
| | | Total | 100 | 81.25 | |

FIG. 18A

Lines

| Details | Line | Start Price | Target Price | Unit | Estimated Quantity | Estimated Total Amount | Target Minimum Release Amount | Active Quotes |
|---|---|---|---|---|---|---|---|---|
| ⊞ Show | 1 Educational Outreach Building | | | | | | | Sealed |
| ⊞ Show | 1.1 Demolition Cost | | 125,000 | Each | 1 | | | Sealed |
| ⊞ Show | 1.2 Site Work - Site Preparation | | 175,000 | Each | 1 | | | Sealed |
| ⊞ Show | 1.3 Construction - Foundation | | 350,000 | Each | 1 | | | Sealed |
| ⊟ Hide | 1.4 Construction - Shell & Interior | 3 | 750,000 | Each | 1 | 3,623,750 | 3,623,750 | 3 |

Cost Factors

| Cost Factor | Type | Display to Suppliers | Target Value | Quote Value | Pricing Basis |
|---|---|---|---|---|---|
| Line Price | Supplier | Yes | | 3,250,000 | Per-Unit |
| INSURANCE | Supplier | Yes | | 11.5 | % of Line Price |

Attachments

| Title | Description | Last Updated | Usage | Update | Delete | Publish to Catalog |
|---|---|---|---|---|---|---|
| No Results Found | | | | | | |

| Details | Line | Start Price | Target Price | Unit | Estimated Quantity | Estimated Total Amount | Target Minimum Release Amount | Active Quotes |
|---|---|---|---|---|---|---|---|---|
| ⊟ Hide | 1.5 Infrastructure, Telecommunication & Others | 3 | 225,000 | Each | 1 | 1,003,500 | 1,003,500 | 3 |

Cost Factors

| Cost Factor | Type | Display to Suppliers | Target Value | Quote Value | Pricing Basis |
|---|---|---|---|---|---|
| Line Price | Supplier | Yes | | 900,000 | Per-Unit |
| INSURANCE | Supplier | Yes | | 11.5 | % of Line Price |

Attachments

| Title | Description | Last Updated | Usage | Update | Delete | Publish to Catalog |
|---|---|---|---|---|---|---|
| No Results Found | | | | | | |

FIG. 18B

FACILITATING MULTI-PHASE ELECTRONIC BID EVALUATION

BACKGROUND

1. Technical Field

The present disclosure relates generally to electronic commerce and more specifically to facilitating multi-phase electronic bid evaluation.

2. Related Art

Bidding refers to a process in which a buyer requests bids from various suppliers for goods/services sought to be procured/sourced, and evaluates the received bids to select a suitable supplier generally according to a pre-specified criteria. Typically, the requests are in the form of request for quotes/information/proposals (RFQ/I/Ps or in general RFXs), tenders, etc. In general, the buyer specifies the specific terms and information that is required as a part of the bid, and the supplier accordingly provides the requested information/terms.

It is often required that the bid evaluation be conducted in multiple phases. For example, government/public sector organizations in several countries, such as India require that suppliers be evaluated in two phases—a technical phase and a commercial phase. In the technical phase the technical capability of the suppliers (for providing the desired goods/services) is evaluated while in the commercial phase the cost of providing the specific goods/services, delivery/promised dates, transportation/logistics planning etc. are evaluated. Other types and/or number of phases may also be conducted as part of bidding.

In a prior paper-based approach, such multi-phase bid evaluation required each supplier organization to submit quotes with technical and commercial information in separate sealed envelopes with the appropriate envelopes being opened during the corresponding phase. In such an approach, the envelopes containing commercial information of only suppliers qualifying in the technical phase are opened for further evaluation. The envelopes containing the commercial information of the non-qualifying suppliers may be disposed of or returned, without opening them.

Unfortunately, such paper-based approaches are often inconvenient and inefficient.

BRIEF DESCRIPTION OF THE DRAWINGS

Example embodiments of the present invention will be described with reference to the accompanying drawings briefly described below.

FIGS. 3A, 3B and 3C together depict the manner in which the header detail of a new two-phase request for quote (RFQ) is specified (by a buyer) in one embodiment.

FIG. 4 depicts the manner in which the line detail of a two-phase RFQ is specified (by a buyer) in one embodiment.

FIGS. 5A and 5B together depict the manner in which attributes (implicitly associated with technical/commercial phases) of a line of a two-phase RFQ are specified (by a buyer) in one embodiment.

FIG. 6 depicts the manner in which scoring teams for evaluating various sections of a two-phase RFQ are specified (by a buyer) in one embodiment.

FIG. 8 depicts a portion of a printed copy of a two-phase RFQ, which may be used by a supplier to send a paper-based quote in one embodiment.

FIGS. 9A and 9B together depict the manner in which a new quote in response to a RFQ is created (by a supplier) in one embodiment.

FIG. 11 depicts the manner in which a quote is reviewed and submitted (by a supplier) in one embodiment.

FIG. 12 depicts the manner in which an indication that a technical phase of a two-phase RFQ is to be accessed for evaluation is indicated (by a buyer) in one embodiment.

FIGS. 14A-14B illustrate the manner in which quote information associated with the technical phase is viewed (by a buyer) in one embodiment.

FIG. 15 illustrates the manner in which quote information associated with the technical phase is scored/evaluated (by a buyer) in one embodiment.

FIGS. 16A-16D together depicts the manner in which an indication that the technical phase of a two-phase RFQ is complete and that the commercial phase is to be accessed is indicated (by a buyer) in one embodiment.

FIGS. 18A-18B together illustrate the manner in which quote information associated with the commercial phase is viewed (by a buyer) in one embodiment.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

Figure 1:
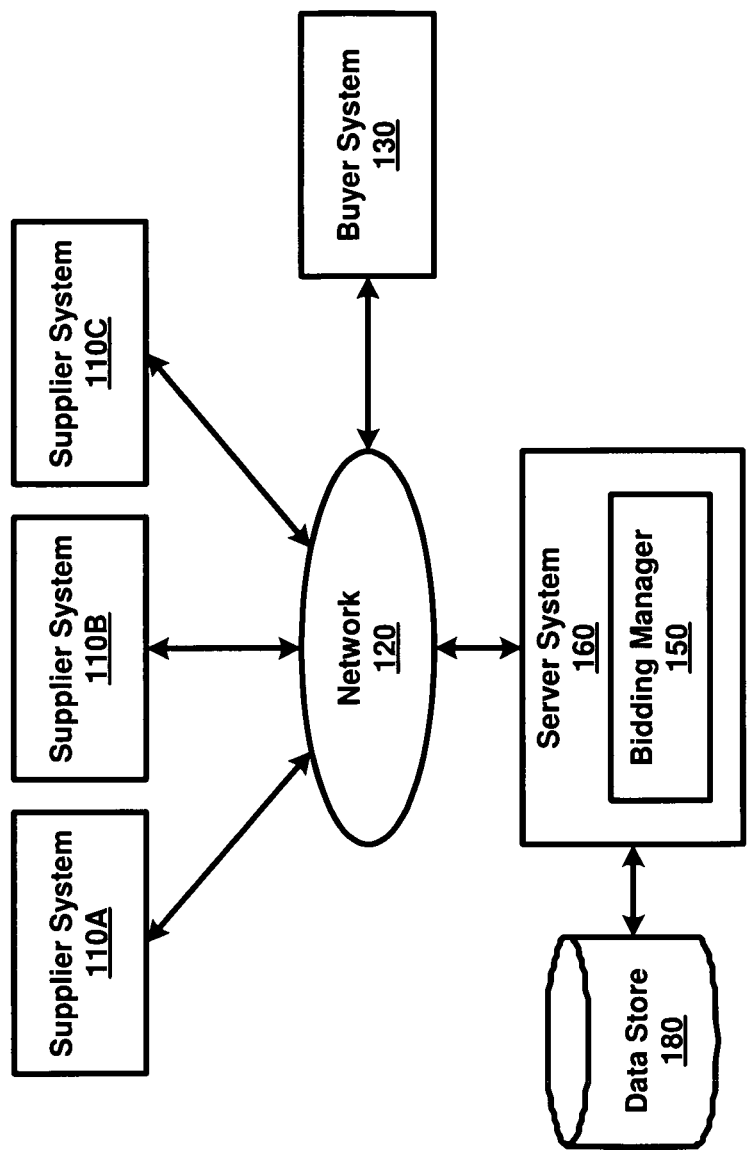
FIG. 1 is a block diagram illustrating an example environment (computing system) in which several aspects of the present invention can be implemented.

An aspect of the present invention provides a computer implemented approach to facilitate multi-phase evaluation of a bidding conducted between a buyer and multiple suppliers. In one embodiment, a digital processing system receives information packets from the multiple suppliers, with each information packet corresponding to a bid received from a supplier and containing information elements associated with one of a sequence of phases.

On receiving an indication (from a buyer) indicating that a specific phase (contained in the sequence of phases) of the bidding is to be evaluated starting at a time instance, the digital processing system allows the buyer access of information elements associated with the specific phase only after the time instance. The information elements associated with a previous phase (occurring prior to the specific phase in the sequence of phases) is allowed access even before the time instance.

In one embodiment, the digital processing system receives a data specifying the suppliers who have successfully qualified in a previous phase prior to the specific phase and then allows access of information elements associated with the specific phase corresponding only to the qualified suppliers in response to the indication. The information elements corresponding to the suppliers who have not successfully qualified are not allowed access for all of the sequence of phases starting with the specific phase.

Another aspect of the present invention provides a buyer the ability to first specify the completion of a previous phase and then later to specify the commencement of the specific phase. The buyer is also provided the ability to revert back to the previous phase before specifying commencement of the specific phase.

Yet another aspect of the present invention enables a supplier to a plurality of attachments as part of an information packet (representing a bid), with each attachment associated with one of the sequence of phases. The digital processing system then (in response to an indication indicating a specific phase) allows access to the buyer only the attachments associated with the specific phase.

One more aspect of the present invention enables a buyer (or a user/administrator representing the buyer organization) to provide user-defined names for corresponding phases in a multi-phase bid evaluation. The user-defined names are used in place of pre-defined names to uniquely identify the phases.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, with other methods, or combining one or more aspects/features described herein, etc. In other instances, well-known structures or operations are not shown in detail to avoid obscuring the features of the invention.

2. Example Environment

FIG. 1 is a block diagram illustrating an example environment (computing system) in which several aspects of the present invention can be implemented. The block diagram is shown containing supplier systems 110A-110C, network 120, buyer system 130, server system 160 (containing bidding manager 150), and data store 180.

Merely for illustration, only representative number/type of systems is shown in the Figure. Many environments often contain many more systems, both in number and type, depending on the purpose for which the environment is designed. Each block of FIG. 1 is described below in further detail.

Network 120 provides connectivity between various supplier systems 110A-110C, buyer system 130, and server system 160. Network 120 may be implemented using protocols such as Internet Protocol (IP) well known in the relevant arts. In general, network 120 transports IP packets from a source system to a target system, with each IP packet having the IP addresses of the source system and the target system in the source address field and the destination address field respectively.

Data store 180 provides a non-volatile storage for storing and retrieving details of requests for bids as well as corresponding bids received from various suppliers. In one embodiment, data store 180 is implemented using relational database technologies and therefore provides storage and retrieval of data using structured queries such as SQL.

Each of supplier systems 110A-110C and buyer system 130 represents a system such as a personal computer, workstation, mobile station, etc., capable of sending requests to server system 160 and receiving corresponding responses.

Buyer system 130 enables a buyer (or a user representing a buyer organization) to create and send a request for bids to server system 160. Each of supplier systems 110A-110C enables suppliers (or users representing supplier organizations) to submit bids as a response to the requests created by a buyer. The requests for bids and the corresponding bids may be created (by buyers/suppliers) using appropriate interfaces.

Server system 160 represents a server, such as a web/application server, which executes software programs (such as bidding manager 150) capable of processing requests generated by one of supplier systems 110A-110C and buyer system 130. It may be appreciated that server system 160 may contain other software programs such as operating system, device drivers, virtual machines etc., (not shown) that provide a run time environment based on which many user applications (such as bidding manager 150) can potentially be executed.

Bidding manager 150 represents a software program that facilitates electronic bidding in multiple phases according to several aspects of the present invention. Bidding manager 150 is designed to receive requests (from one of supplier systems 110A-110C, buyer system 130) and send corresponding responses thereby enabling buyers to create/send multi-phase requests for bids and suppliers to create/send quotes in response to corresponding requests for bids.

Bidding manager 150 may maintain details of the requests for bids and the corresponding bids received in response in data store 180. The manner in which bidding manager 150 facilitates multi-phase electronic bidding is described below with examples.

3. Facilitating Multi-phase Electronic Bid Evaluation

Figure 2:
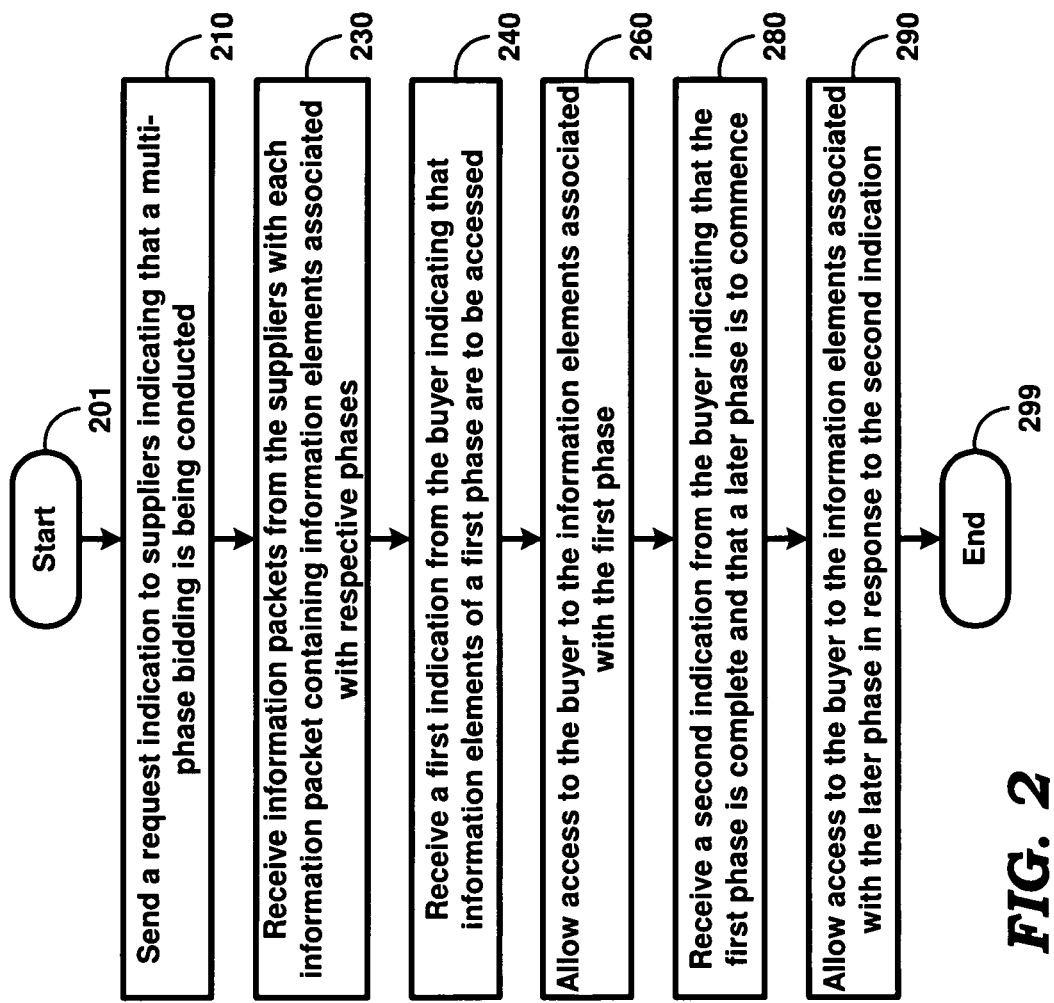
FIG. 2 is a flowchart illustrating the manner in which multi-phase electronic bidding is facilitated according to an aspect of the present invention.

FIG. 2 is a flowchart illustrating the manner in which multi-phase electronic bid evaluation is facilitated according to an aspect of the present invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 201, in which control immediately passes to step 210.

In step 210, bidding manager 150 sends a request indication to suppliers (or corresponding supplier systems) indicating that a multi-phase bidding is being conducted. The request indication may merely notify the suppliers of the multi-phase bidding or include additional details (e.g., the specific buyer, the nature of the services/products that are to be procured/sourced, the nature of information requested in the bid, etc.) that would be relevant to the bidding process. The notification may be in the form of an advertisement in a newspaper or as an insert in a public document made available in printed/electronic form. Suppliers may then be required to search for such multi-phase bidding opportunities and to respond appropriately.

The request indication may be sent in response to receiving a request for bids (such as RFQ, RFI, RFP, etc.) from a buyer (using buyer system 130). The buyer may also indicate the specific suppliers to whom the indication is to be sent. As such, bidding manager 150 may send the indication to only the suppliers specified in the request data. Alternatively, the request indication may be sent to all the suppliers based on the supplier information maintained in data store 180.

In step 230, bidding manager 150 receives information packets from the suppliers (or users representing the supplier organization), with each information packet containing information elements associated with respective phases. Each information packet corresponds to a bid sent by a supplier organization (from one of supplier systems 110A-110C) using appropriate interfaces.

The information elements in the bid may be associated with the respective phases either manually by the supplier or may be determined based on the pre-defined associations created in the request for bid by the buyer. In the description herein, it is conveniently assumed that one information element corresponds to a single phase.

In step 240, bidding manager 150 receives a first indication from the buyer indicating that information elements of a first phase are to be accessed. In step 260, bidding manager 150 allows access to the buyer (or users representing the buyer organization) to the information elements associated with the first phase.

It may be appreciated that in certain scenarios, bidding manager 150 allows access to the information elements to all the suppliers (or users representing the supplier organizations) taking part in the multi-phase bidding. For example, when the buyer is a public sector organization, it may be necessary that the suppliers be provided access to the bidding information to comply with regulations and/or to ensure transparency of the bidding process.

In step 280, bidding manager 150 receives a second indication from the buyer indicating that the first phase is complete and that a later phase is to be accessed. Bidding manager 150 may also receive a data specifying a specific/shortlisted set of suppliers who have successfully qualified in the first phase. Bidding manager 150 then ensures that the data/information packets corresponding to the suppliers not included in the shortlisted set of suppliers are not allowed access during any of the subsequent phases.

In step 290, bidding manager 150 allows access to the buyer to the information elements associated with the later phase in response to the second indication. As described above, the access to the information elements may also be provided to all the suppliers taking part in the multi-phase bidding. Further, during the later phases of the evaluation, in the scenario that data specifying a shortlisted set of suppliers is received, bidding manager 150 allows access only to the information provided by the shortlisted set of suppliers.

In one embodiment, the information elements associated with either of first or later phases noted above are allowed access in response to the second indication. The flow chart ends in step 299.

It may be appreciated that the buyer (or users representing the buyer organization) is not allowed access to the information elements associated with the second phase before receiving the second indication. The prevention of access can be based on several approaches, as will be apparent to one skilled in the relevant arts by reading the disclosure herein. In one approach, bidding manager 150 maintains data (corresponding to the information packets) in an encrypted form in data store 180 and allows access by decrypting only the information elements allowed access in a specific phase.

Alternatively, third party services may be employed to hold in confidence the information elements not yet available for access. The interface with such third party computer systems can also be in electronic form by using appropriate convention. One of various escrow service providers may be used to maintain the required information elements in confidence.

As another alternative, the prevention of access may be enforced using software based access controls with the software preventing access to the stored data (representing the information elements with or without encryption). For example, the stored information elements may be allowed access only using a specific set of user interfaces (for example, the interfaces described below). Thus, by displaying only the information elements allowed access during a specific phase using the specific set of user interfaces, the access to the data is controlled by bidding manager 150.

It should be appreciated that the second indication may be viewed as indicating a time instance only after which the information elements corresponding to the later phase are allowed access. Accordingly, in alternative embodiments, the time instance can be specified using other approaches. For example, the buyer may indicate the time instance using the chronological time (e.g., past mid-night of Oct. 5, 2007). Access to information elements of the corresponding later phase is permitted only after the indicated chronological time.

Due to the controlled access to information as described above, bidding manager 150 facilitates multi-phase electronic bid evaluation to be conducted. The manner in which bidding manager 150 facilitates evaluation of multi-phase bidding in one embodiment is illustrated below with examples.

4. Example Illustrating Multi-Phase Bid Evaluation

FIGS. 3A to 18B illustrate the manner in which a two-phase electronic bid evaluation is conducted in one embodiment. For understandability, a broad conceptual framework is first provided, followed by a detailed description of each Figure.

It may be appreciated that though the description is continued with respect to a two-phase request for quote (RFQ), in alternative embodiments, the bid evaluation may be conducted in multiple phases (more than two) using any form of requests such as requests for proposals (RFP), tenders, etc. Further, it is assumed that the term "first phase" refers to any one of the phases, with the terms "previous phase" and "later phase" referring to phases before and after the "first phase" in an order according to the multiple (sequence of) phases.

Broadly, a buyer first creates a two-phase RFQ for specific goods and/or services, with the two phases being a technical evaluation phase and a commercial evaluation phase. The buyer specifies the details of the RFQ such as header and lines of the RFQ using corresponding interfaces depicted in FIGS. 3A-3C and FIG. 4. The buyer then specifies the technical/commercial attributes associated with each line of the RFQ using the interfaces depicted in FIGS. 5A-5B.

In one embodiment, the buyer specifies the scoring teams (containing users representing the buyer organization) for evaluating the various sections of the RFQ (FIG. 6). The members belonging to each scoring team are given access to the phases of the RFQ based on the phases associated with the various sections of the RFQ specified for the scoring team.

The description is continued assuming that the term "buyer" includes the appropriate scoring team members (having access to the relevant phase).

The buyer reviews the created RFQ (FIG. 7) and sends it for publication, thereby triggering bidding manager 150 to send a request indication to suppliers that a two-phase bidding is being conducted.

In response to the request indication, suppliers may download a printable version of the RFQ (FIG. 8) and then send a paper-based quote/bid (containing the information corresponding to the two phases) to the organization maintaining server system 160. The details received in the paper-based quotes may then be input in to bidding manager 150 using appropriate interfaces (for example, similar to the interfaces described below).

Figure 9A:
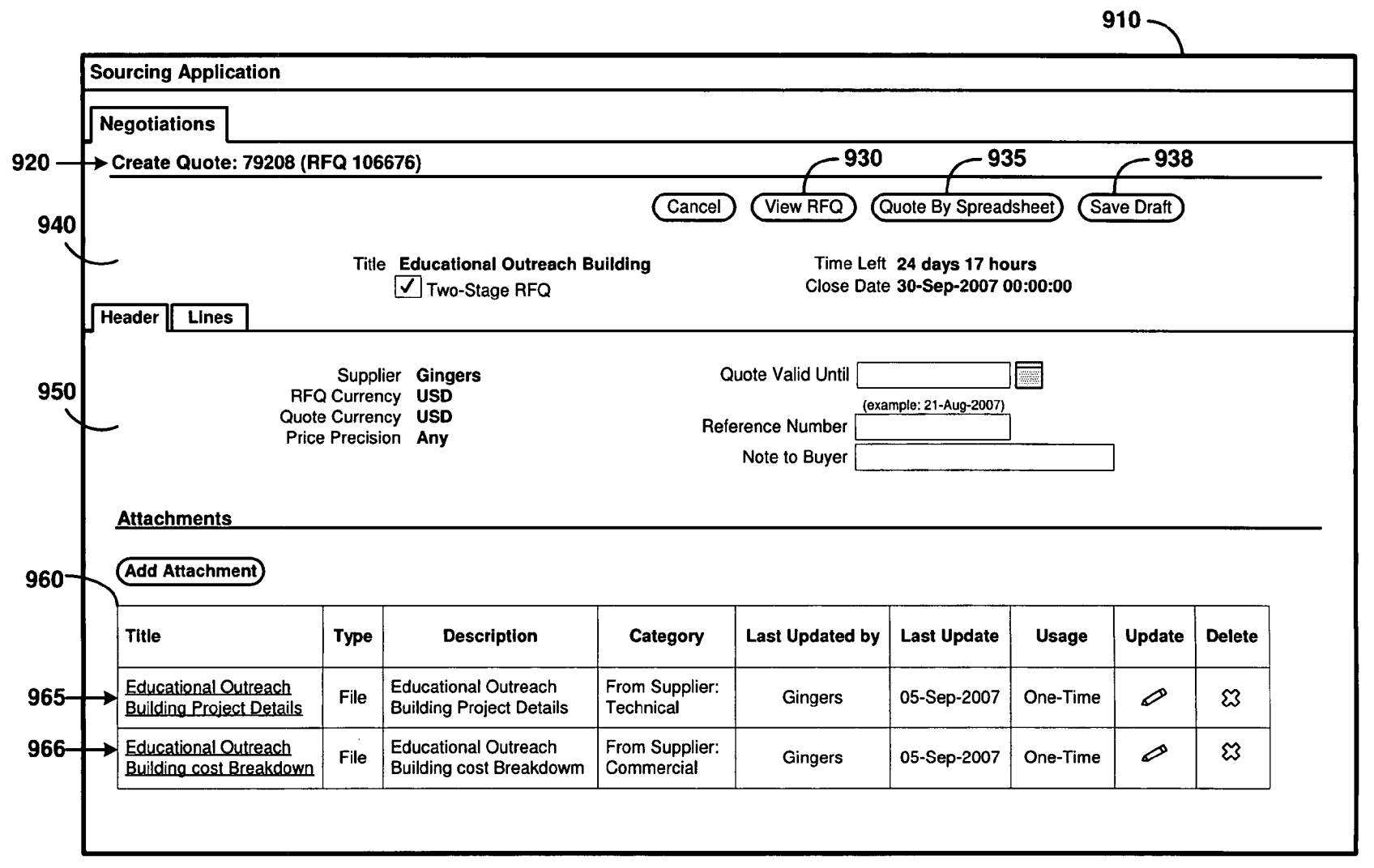
Figure 9B:
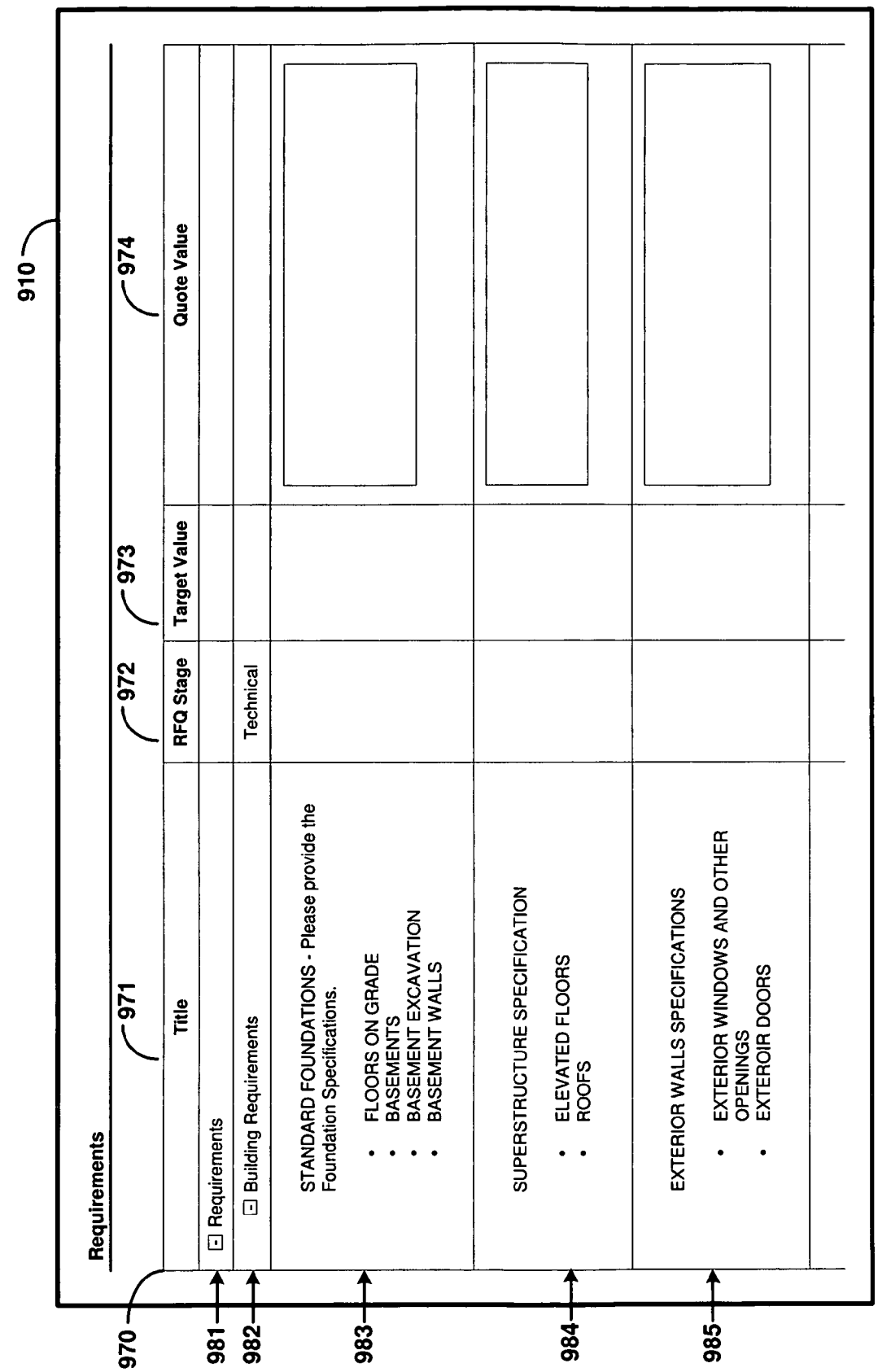

A supplier may also create a quote/bid electronically by specifying the information corresponding to the technical/commercial phases using the interfaces shown in FIGS. 9A-9B. The supplier may also send documents (attached with the quote) associated with specific phases of the multi-phase bidding (using the interface depicted in FIG. 10). After reviewing the created quote (FIG. 11), the supplier submits the quote for evaluation to bidding manager 150.

During the creation of the RFQ, the buyer may also indicate a period (between an open date and a close date) during which suppliers may send quotes in response to the RFQ. As such after the expiry of the close date, the buyer may indicate that the technical phase of a two-phase bid evaluation is to be commenced/accessed (FIG. 12).

Figure 13:
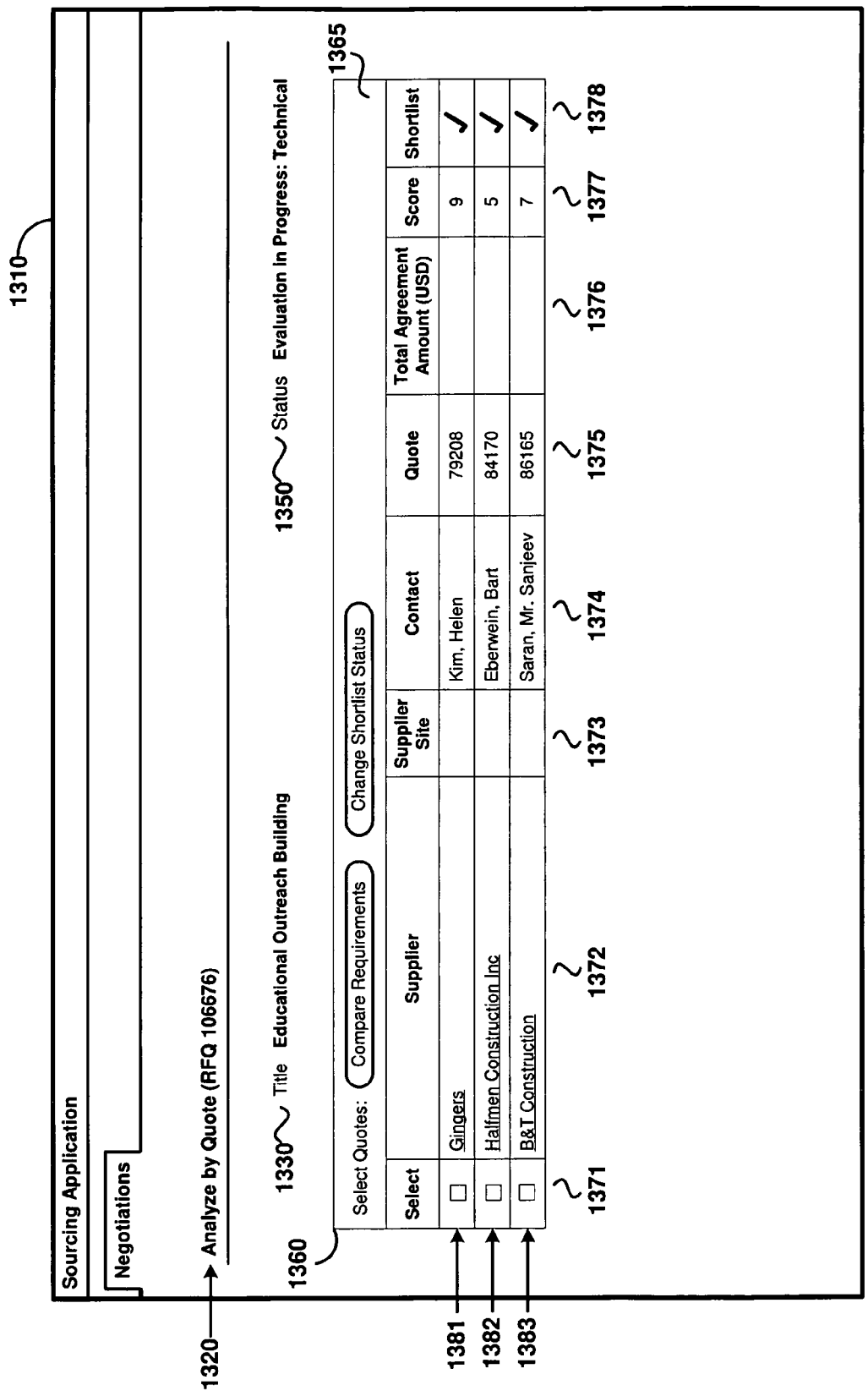
FIG. 13 depicts the manner in which quotes received in response to a specific two-phase RFQ is accessed (by a buyer) in one embodiment.

In response, bidding manager 150 displays the received quotes to the buyer (or members of the corresponding scoring team) as shown in FIG. 13. On receiving an indication from the buyer that the details of a specific quote is to be displayed/accessed, bidding manager 150 ensures that only the information elements associated with the technical phase are displayed to the buyer (FIGS. 14A and 14B). It may be appreciated that the suppliers may also be provided access to the information elements associated with the technical phase using appropriate interfaces (similar to FIGS. 14A and 14B). It is noted that information elements associated with the commercial phase are not allowed access to either buyer or suppliers.

Figure 16B:
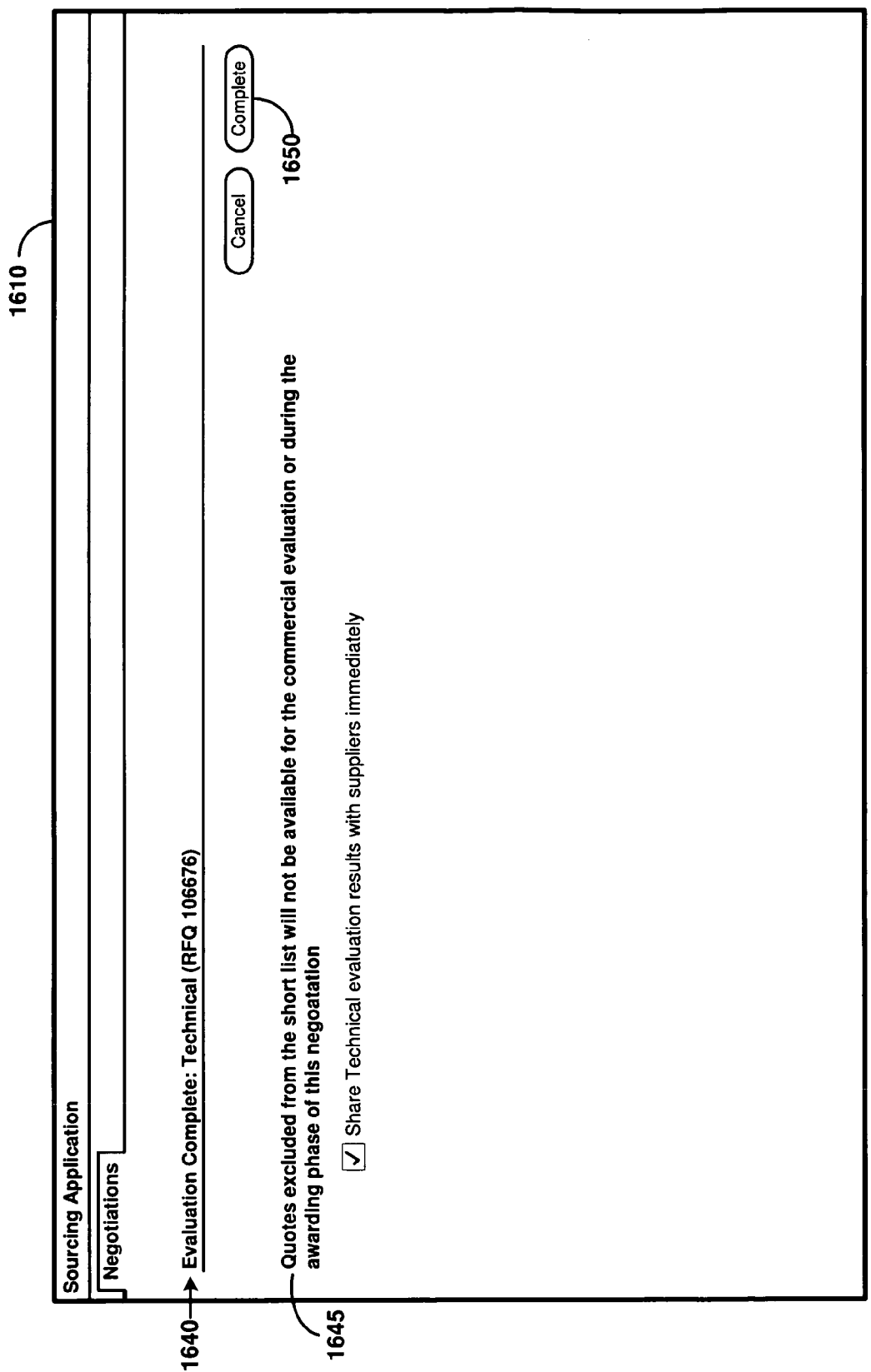

The displayed quotes are then evaluated by the buyer based on scores provided by the corresponding scoring teams (as depicted in FIG. 15) and the suppliers satisfying the required criteria in the technical stage are shortlisted. The buyer then indicates that the technical phase evaluation is completed (FIGS. 16A and 16B) and that the commercial (later) phase is to be commenced/accessed (FIG. 16D). In one embodiment, the buyer is enabled to undo completion of the technical phase evaluation (FIG. 16C) before commencing the commercial phase evaluation.

Figure 17:
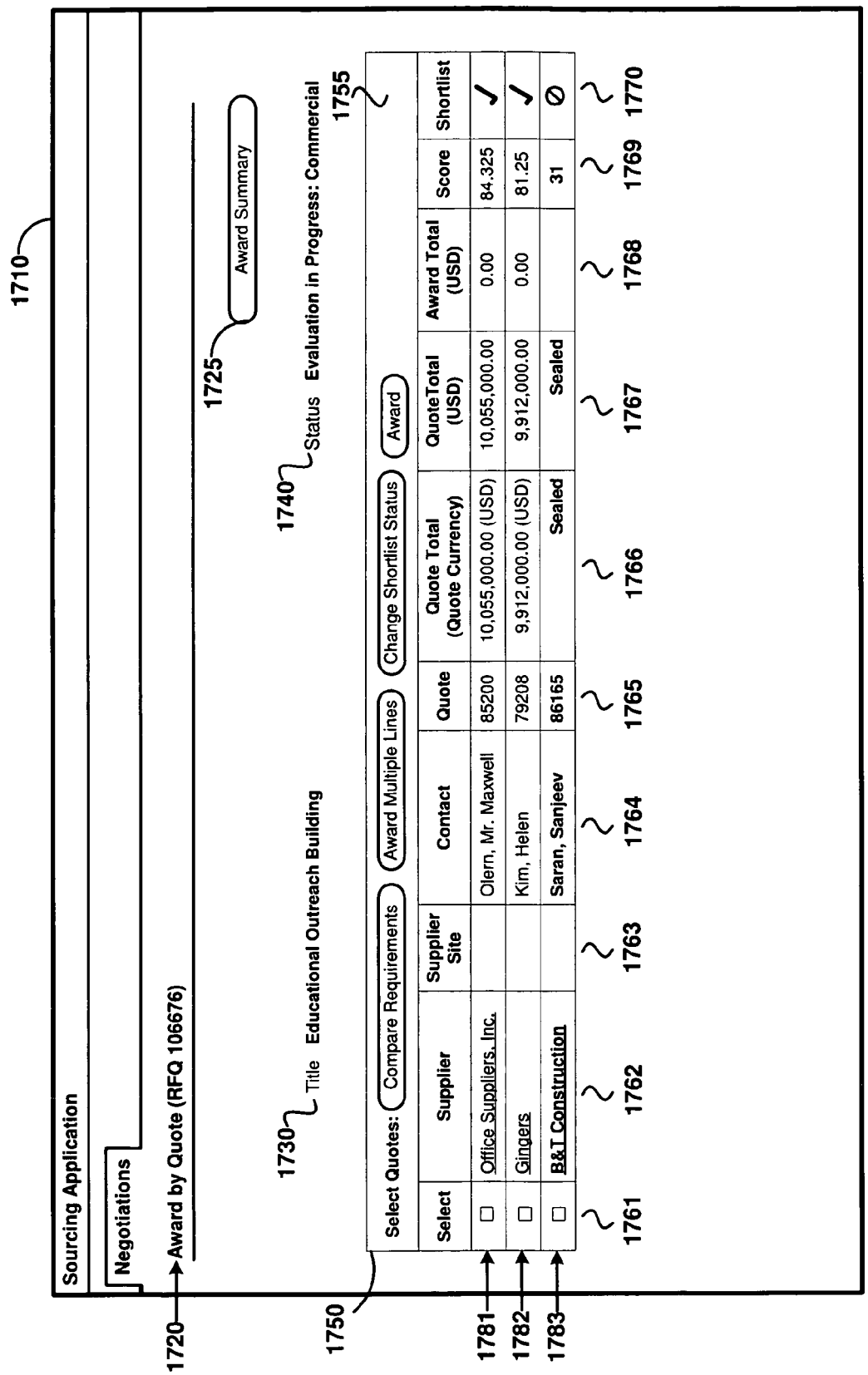
FIG. 17 depicts the manner in which quotes shortlisted after the completion of the technical phase is accessed (by a buyer) in one embodiment.

In response, bidding manager 150 displays the quotes corresponding to the suppliers that were shortlisted in the technical phase as shown in FIG. 17. On receiving an indication that the details of a specific quote is to be accessed, bidding manager 150 displays the information elements associated with either the technical phase or the commercial phase (FIGS. 18A and 18B).

It may be appreciated that the information related to the suppliers that were not shortlisted is not allowed access to either buyers or suppliers. The information related to the suppliers that were not shortlisted is displayed as "Sealed", indicating that such information is not accessible in any of the subsequent phases.

The shortlisted quotes may then be evaluated based on a second set of scores (FIG. 19) and one or more supplier organizations (termed winning suppliers) may be awarded/selected for supplying the specific goods and/or services (as specified in the RFQ).

Thus, bidding manager 150 conducts a multi-phase bid evaluation in one embodiment. The description is continued illustrating the manner in which a buyer creates a two-phase RFQ in one embodiment.

5. Creating a Two-Phase RFQ

FIGS. 3A-3C, 4, 5A-5B, 6, and 7 together illustrate the manner in which a two-phase RFQ is created by a buyer in one embodiment. Each of the Figures is described in detail below.

Figure 3A:
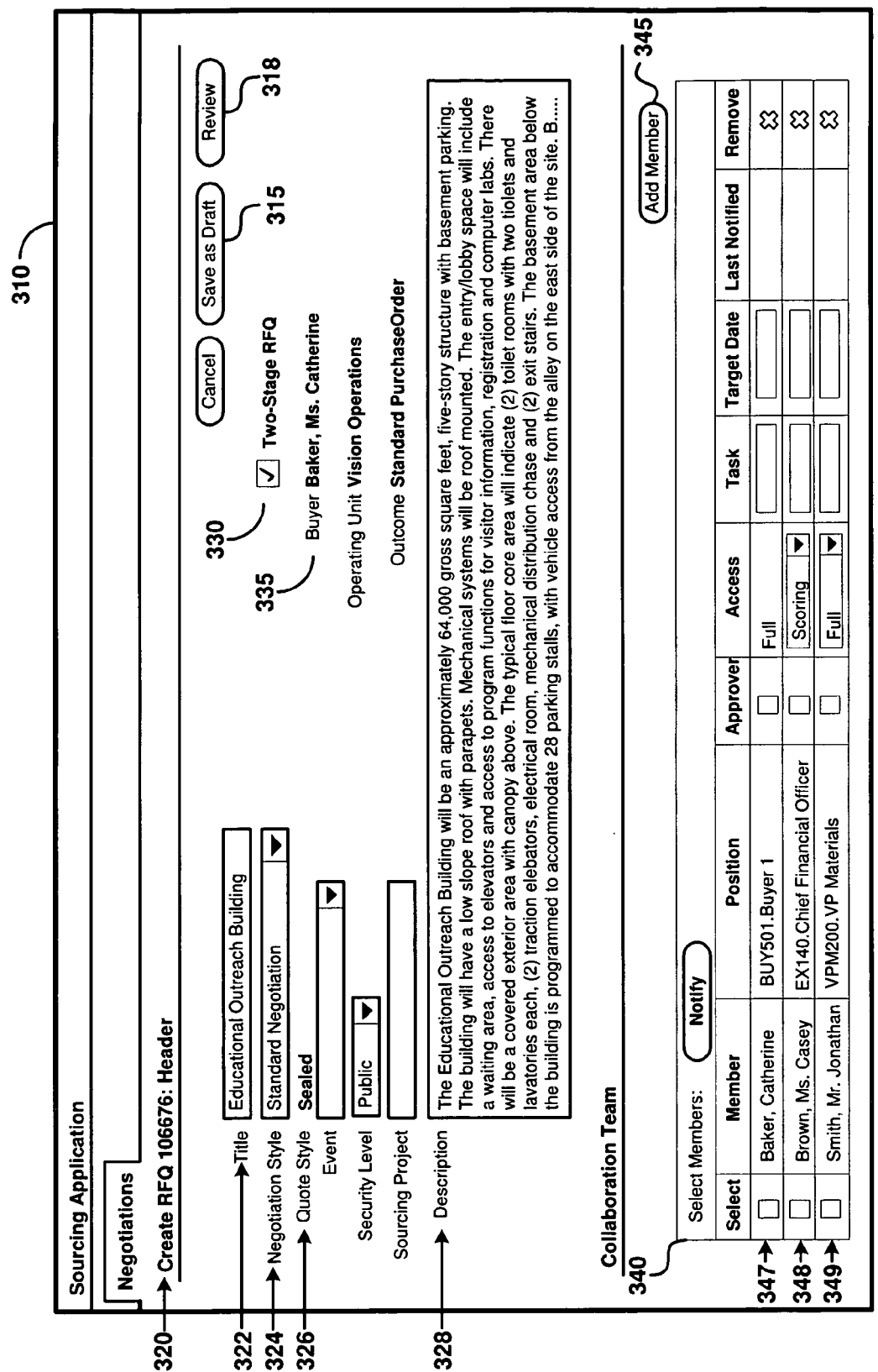

FIGS. 3A, 3B and 3C together depict the manner in which the header detail of a new two-phase RFQ is specified (by a buyer) in one embodiment. Display area 310 (as well as all the following FIGS. 4-19) depicts a portion of a screen displayed on a display screen provided on a display unit (2070), with a user providing inputs (as described below) using an appropriate input interface (2090).

In general, each display area (of FIGS. 3A-19) may be viewed as containing multiple fields with corresponding labels provided by bidding manager 150 (according to the executed software instructions), and a buyer/supplier may enter an appropriate value for each field, as desired. Though not shown, it may be appreciated that the appropriate values may be uploaded by a buyer/supplier as an electronic document, for example as a text or a XML file.

Accordingly, display area 310 enables a buyer to specify the header detail of a new request for quote (RFQ) identified by the unique number 106676 (as indicated in text 320). Fields 322, 324, 326, and 328 respectively specify the title of the RFQ as "Educational Outreach Building", the negotiation style as "Standard Negotiation", the quote style as "Sealed" and the description of the RFQ.

Checkbox 330 (labeled "Two-Stage RFQ") specifies that the RFQ is a two-phase RFQ (as indicated by its selection). As described above, the two phases are assumed to be as a first/technical phase and a later/commercial phase. Field 335 indicates the buyer responsible for creating the RFQ as being "Baker. Ms. Catherine".

Button 315 enables the buyer to save the header details of the new RFQ as a draft version in a persistent storage (for example, data store 180). Button 318 may be used to send the RFQ for review as described in detail below with respect to FIG. 7.

Table 340 depicts the members of the buyer organization (referred to as the collaboration team) who collaborate with the buyer in the evaluation of the RFQ. Button 345 enables the buyer to add new members to the team, while the icon in the "Remove" column in the table enables the buyer to remove existing members in the team.

Each of rows 347-349 depicts the details of a member of the collaboration team, such as the name of the member, the position, the access details (such as "Full" access or "Scoring" access), the various tasks to be performed, and the target date for completion of performance of the tasks.

In FIG. 3B, a buyer may click/select button 350 to select scoring settings corresponding to the members of the collaboration team as described in detail below with respect to FIG. 6. Evaluation of quotes received in response to the RFQ is performed appropriate scoring teams selected from the collaboration team. As described above, the short listing of suppliers in the technical phase and the selection of winning suppliers in the commercial phase is performed based on the scores attributed to the quotes by the corresponding scoring teams during evaluation in the corresponding phase.

Table 360 (depicted in FIGS. 3B and 3C) depicts the header detail (requirements) of the new RFQ. Column 371 enables the buyer to select the desired requirements by selecting the corresponding check boxes and to perform various actions (as depicted in display areas 365 and 395) with the selected requirements. Such actions may include adding new requirements/sections, removing existing requirements/sections etc.

Columns 372-377 respectively indicate the detailed text, the RFQ stage/phase, the type (required or optional), the target price, the weight (of the score), and the maximum score associated with each requirement. Column 378 contains an update icon using which a buyer may change the details of each requirement using an appropriate interface (not shown).

Each of rows 381-389 specifies the details of a requirement of the RFQ. It may be observed that the requirements are organized in a hierarchical manner with row 381 being the root, rows 382, 386 and 388 being the children of the root row 381, and rows 383-385, 387, 389 being children of the corresponding rows 382, 386 and 388. In general, the RFQ stage/phase associated with a node in the hierarchy is assumed to apply to all its children.

Accordingly, rows 382-385 correspond to requirements associated with the technical phase and rows 386-389 correspond to requirements associated with the commercial phase. It may be observed that the default (pre-defined) names "Technical" and "Commercial" of the two-phase RFQ have been changed to user-defined names "Engineering" and "Financial" as per the requirements of the buyer. Such a change of default/pre-defined names does not change the order and/or the manner in which the stages/phases are evaluated.

Thus, an administrator/user representing the buyer organization may modify the names of the different phases in accordance to the (common) terminology used in the industry where the features of the invention are sought to be implemented.

The buyer after specifying the header detail (requirements) of the new two-phase RFQ may specify the line detail of the new RFQ as described in detail below.

6. Specifying Line Detail of a Two-Phase RFQ

FIG. 4 depicts the manner in which the line detail of a two-phase RFQ is specified (by a buyer) in one embodiment. Display area 410 enables a buyer to specify the line detail of the new RFQ identified by the unique number 106676 (as indicated in text 420). Buttons 415 and 418 perform actions similar to buttons 315 and 318 as described above.

Table 450 depicts the various lines of the new RFQ. Column 460 enables the buyer to select the desired lines by selecting the corresponding check boxes and to perform various actions (as depicted in display areas 455) with the selected lines.

Columns 461-465, 467 respectively indicate the description (provided as a link to enable selection), the item/revision, the category, the unit of measurement, the quantity, the requisition associated with each line. Column 466 contains a add line icon enabling addition of new lines to the table. Columns 468 and 469 respectively contain update, and delete icons using which the corresponding line may be updated (using an appropriate interface not shown) and deleted.

Each of rows 481-488 specifies the details of a line of the RFQ. It may be observed that the lines are also organized in a hierarchical manner with the corresponding line number (shown in the description, column 461) indicating the hierarchy. As such, rows 482-488 having the respective line numbers "1.1" to "1.7" are deemed to be the children of the row 481 having the line number "1". Each row/line may also be associated with corresponding technical/commercial attributes as described in detail below.

Figure 5A:
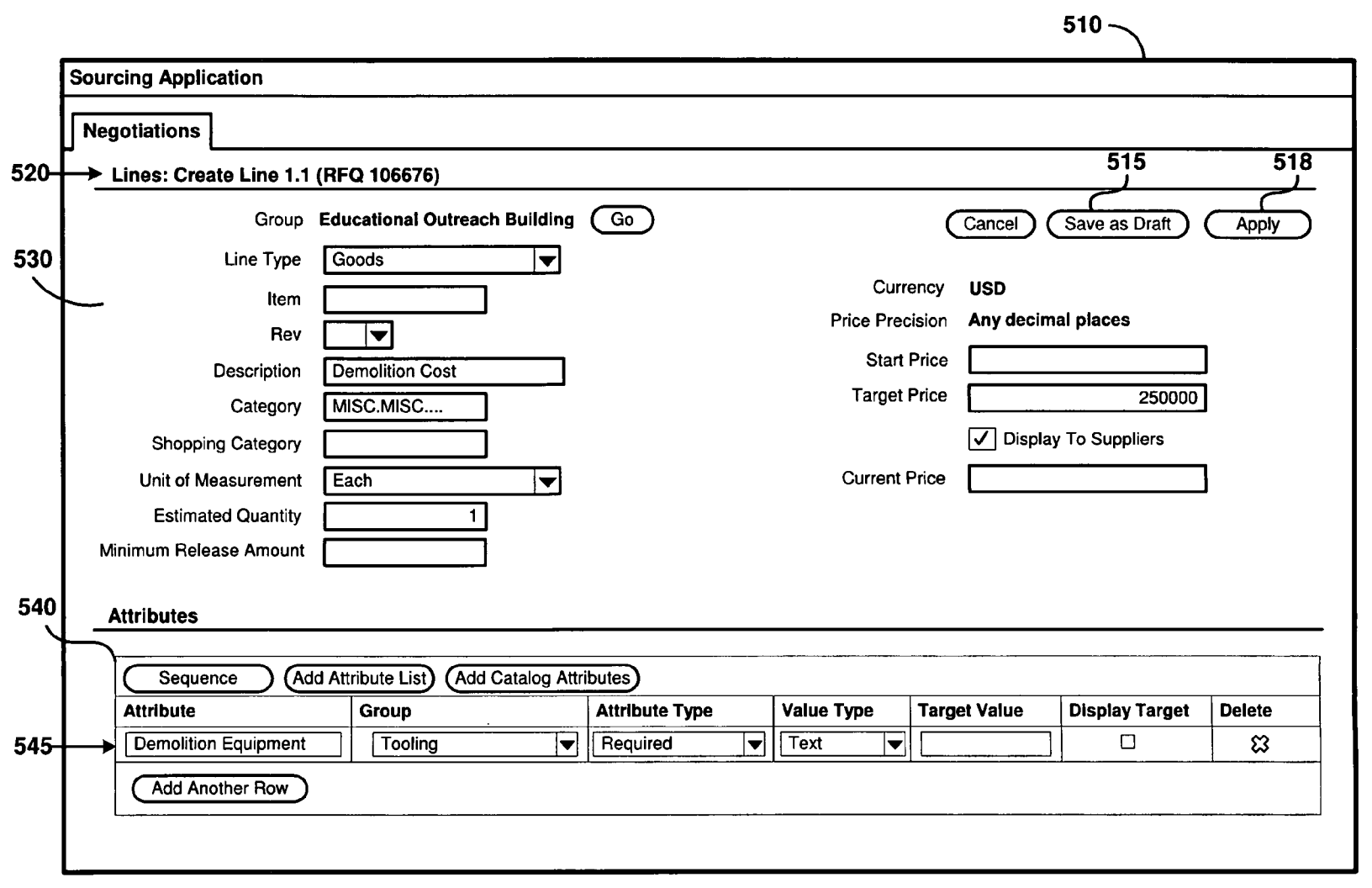

FIGS. 5A and 5B together depict the manner in which attributes (implicitly associated with technical/commercial phases) of a line of a two-phase RFQ are specified (by a buyer) in one embodiment. Display area 510 enables a buyer to specify various attributes with a specific line with line number "1.1" (as depicted in text 520) corresponding to row 482 of FIG. 4. Display area 510 may be displayed in response to the buyer selecting the link provided in column 461 corresponding to row 482.

Buttons 515 performs the action similar to button 315 as described above, while button 518 enables the buyer to accept the changes made in FIGS. 5A/5B and to go back to the display of FIG. 4. Display area 530 enables the buyer to specify various details of the specific line (with line number "1.1"), in particular, the description of the line "Demolition Cost", the category, the unit of measurement etc.

Table 540 depicts the various attributes specified associated with the specific line, with row 545 specifying that an attribute with name "Demolition Equipment" belonging to the group "Tooling" of (value) type "Text" is to be associated with the specific line. It may be appreciated that by a pre-defined convention, the attributes specified in table 540 are associated with the technical phase of the two-phase RFQ.

In FIG. 5B, table 560 depicts the various cost factors associated with the specific line with row 562 specifying a cost factor named "Administration Fee A3" of type "Buyer" having the pricing basis of "Fixed Amount", which is displayed to the suppliers (as indicated by the selected checkbox). Similarly, row 564 specifies another cost factor associated with the specific line. By the pre-defined convention, the cost factors specified in table 560 are associated with the commercial phase of the two-phase RFQ.

Field 580 enables buyer to specify notes for the suppliers, while button 585 enables the buyer to attach documents associated with the specific line. Thus, a buyer may specify the attributes associated with each line of the new RFQ. As described above, the attributes are implicitly associated (by a pre-defined convention) with either the technical or commercial phase and as such are allowed access after receiving corresponding indications.

Similarly, other lines of the new RFQ may be specified. It may be appreciated that the header and line detail specified above represents the specific information requested from the suppliers, and which is to be included in the quotes sent in response to the RFQ. In addition to sending the specific information, a supplier may also include additional information (for example, attached documents) in the quotes.

It may be further appreciated the buyer in specifying the header/line detail of the new RFQ does not explicitly indicate the respective phases. Each section/portion of the RFQ is by pre-defined convention associated with either the technical phase or the commercial phase, with the buyer indicating only the specific information corresponding to each section.

As described above, the buyer may specify the various scoring teams (as a subset of the collaboration team specified in FIG. 3A) for evaluating various sections of a two-phase RFQ. Accordingly, the description is continued describing the manner in which scoring teams are specified in one embodiment.

7. Specifying Scoring Teams

FIG. 6 depicts the manner in which scoring teams for evaluating various sections of a two-phase RFQ are specified (by a buyer) in one embodiment. Display area 610 enables a buyer to create different scoring teams and to associate corresponding sections of the new RFQ identified by the unique number 106676 (as indicated in text 620) to the newly created scoring teams.

Display area 610 may be displayed in response to the buyer clicking/selecting button 350 (labeled "Select Scoring Settings") in FIG. 3B. The selection of checkbox 625 indicates that the scoring of quotes by teams is enabled. It may be appreciated that in alternative embodiments, the quotes may be evaluated by the users of the buyer organization in any convenient manner.

Table 640 specifies the different teams for performing scoring of quotes (received in response to the RFQ). In particular, row 647 specifies a scoring team named "Assessment Team A" with corresponding instructions and having no price visibility (as indicated by the unselected check box). As such, the scoring team of row 647 may evaluate sections associated with the technical phase in the two-phase RFQ. In contrast, the selected checkbox corresponding to price visibility in row 648 indicates that the corresponding scoring team named "Assessment Team B" may evaluate sections associated with either the technical or the commercial phases of the two-phase RFQ.

Table 660 enables a buyer to specify the scoring team evaluating the various sections of the RFQ. Rows 661-662 and 664 specify sections as being evaluated by "Assessment Team A", while rows 663 and 665-666 specify sections as being evaluated by "Assessment Team B". As described above, the members belonging to each scoring team are given access to the phases of the RFQ based on the phases associated with the various sections of the RFQ specified for the scoring team (shown in table 660).

Buttons 680 and 685 enable the information specified in FIG. 6 to be stored and the control to be passed to the display depicted in display area 310. Thus, the buyer specifies scoring teams evaluating various sections of the RFQ. The buyer after specifying the header/line detail of the new RFQ and specifying the scoring teams may review and publish the newly created RFQ as described in detail below.

8. Reviewing and Publishing a Two-Phase RFQ

Figure 7:
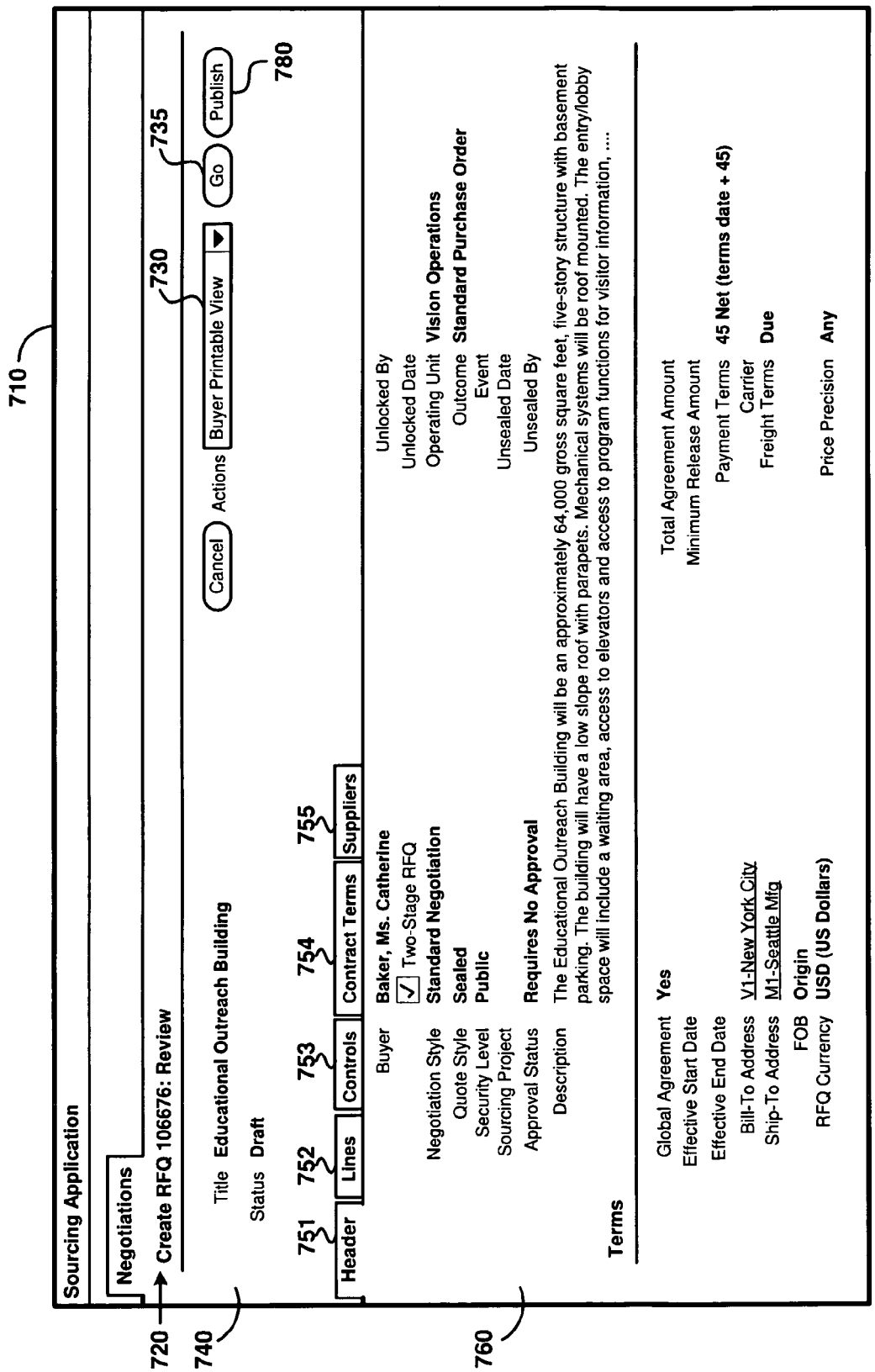
FIG. 7 depicts the manner in which a two-phase RFQ is reviewed (by a buyer) and sent for publication in one embodiment.

FIG. 7 depicts the manner in which a two-phase RFQ is reviewed (by a buyer) and sent for publication in one embodiment. Display area 710 enables a buyer to review and publish the newly created RFQ identified by the unique number 106676 (as indicated by text 720). Display area 740 indicates the title "Educational Outreach Building" of the newly created RFQ and the status of the RFQ as being "Draft".

Select field 730 and button 735 together enable the buyer to perform one of a pre-defined set of actions for the newly created RFQ. For example, the buyer may select the action "Buyer Printable View" in select field 730 and then click on button 735 to cause the performance of the corresponding action, that is, to display the RFQ in a specific format to enable a print copy of the RFQ to be taken.

Tabs 751-755 enable the buyer to view different portions of the two-phase RFQ in the same display area 760. Tab 751 (labeled "Header") is shown as selected, and as such, display area 760 depicts the header detail of the RFQ similar to the information specified in display area 310. On selecting tabs 752, 753 and 754, the line detail, the control detail, and the contract terms corresponding to the newly created RFQ are displayed in display area 760.

On selecting tab 755 (labeled "Suppliers"), the list of suppliers from whom the quotes are to be received in response to the RFQ is displayed in display area 760. The display (not shown) may also enable the buyer to select/indicate a specific set of suppliers from whom quotes are to be received.

Button 780 enables the buyer to send the reviewed RFQ for publication, wherein, a request data corresponding to the newly created two-phase RFQ containing the header/line detail and other information specified by the buyer as described above is sent to bidding manager 150. On receiving the request data, bidding manager 150 may send a request indication to (all or the specific set of) suppliers indicating that a two-phase RFQ is being conducted.

A supplier on receiving such a request indication may create a quote in response to the RFQ, with the created quote containing the specific information (as indicated by the header/line detail) requested by the buyer. The manner in which a supplier creates a quote in response to a two-phase RFQ is described below with examples.

9. Creating a Quote in Response to a Two-Phase RFQ

It may be appreciated that the number of quotes that may be created by the same supplier in response to a RFQ is generally determined by the buyer creating the RFQ. The description is continued assuming that each supplier is allowed to create only one quote (either paper-based or electronic) in response to a RFQ, though the approaches described below may be extended to supporting multiple quotes from the same supplier, as will be apparent to one skilled in the relevant arts by reading the disclosure provided herein.

Thus, on receiving a request indication, a supplier may download and print a printable version of the two-phase RFQ. The supplier may then send a paper-based quote by specifying the information requested by the buyer corresponding to the two phases in the printed copy of the two-phase RFQ.

FIG. 8 depicts a portion of a printed copy of a two-phase RFQ, which may be used by a supplier to send a paper-based quote in one embodiment. Portion 810 depicts a portion of the header detail of a print copy of a two-phase RFQ, with portion 820 indicating various details of the RFQ such as the title and the description (as specified in display area 310).

It may be observed that the texts 830 and 840 specify the open and close date of the RFQ. The value of "Immediately" for the open date indicates that the quotes may be sent immediately and there is no specific date after which the quotes are to be sent. The value "30 Sep. 2007 00:00:00" of the close date indicates the specific date before which the quotes are to be sent (or received by bidding manager 150).

Text 850 indicates that the response quotes are to be evaluated in two stages namely, technical and commercial. Portion 860 indicates the contract terms corresponding to the RFQ, while table 870 depicts the details of the requirements of the RFQ. It may be observed that text 880 indicates the specific phase "Technical" associated with the requirement, thereby enabling the supplier to provide only the information required for the specific phase.

Thus, a supplier may create a paper-based quote and send it to a third-party organization (for example, the organization maintaining server system 160) or the buyer organization. The information contained in such paper-based quotes may then be input in to bidding manager 150 using appropriate interfaces (similar to the interfaces described below with respect to electronic creation of quotes).

Such quotes, which are received as paper-based quotes from the suppliers and then input by the buyer, are often referred to as surrogate quotes. Surrogate quotes enable a buyer to quote on behalf of suppliers similar to quotes directly submitted by the suppliers (using interfaces described below).

Such a paper-based approach may be inconvenient and inefficient (as described in the background section). As such, it may be desirable that suppliers be provided the ability to create quotes electronically (in response to RFQs). Accordingly, the description is continued describing the manner in which suppliers create quotes electronically in one embodiment.

10. Creating a Quote Electronically

FIGS. 9A-9B, 10, 11 together illustrates the manner in which a supplier creates a quote electronically (in response to a RFQ) in one embodiment. Each of the Figures is described in detail below.

FIGS. 9A and 9B together depict the manner in which a new quote in response to a RFQ is created (by a supplier) in one embodiment. Display area 910 enables a supplier to specify the detail of a new quote with identifier 79208 in response to the RFQ identified by the unique identifier 106676 (as indicated in text 920). It may be observed that the RFQ with identifier 106676 corresponds to the RFQ created by the buyer using the interfaces depicted in FIGS. 3A-7.

Button 930 enables the supplier to view the details of the RFQ in response to which the new quote is being created. Button 935 enables the supplier to specify the quote details in a spreadsheet format using an appropriate application. Button 938 (labeled "Save Draft") enables the supplier to save a draft version of the quote in persistent storage (for example, data store 180). The draft version may later be reviewed and submitted as described in detail with respect to FIG. 11.

Display area 940 depicts various details of the RFQ in response to which the new quote is being created. In particular, display area 940 depicts the title of the RFQ, the indication that the RFQ is two-phased (as indicated by the selected check box labeled "Two-Stage RFQ"), the close date and the time left till the closing of the RFQ (calculated as the difference between the current time and the close date).

Display area 950 depicts various details of the new quote provided by the supplier such as the name of the supplier "Gingers", the currency in which the costs/prices in the quote/RFQ is being specified, the validity of the quote (as indicated by the "Quote" Valid Until" field) and any notes to the buyer.

Table 960 depicts the various attachments (generally in the form of documents) to be sent along with the quote that forms part of the quote. The supplier may add new attachments using the "Add Attachment" button and may update or remove the existing attachments using the icons shown in the update and delete columns of table 960. The manner in which new attachments are added is described in detail with respect to FIG. 10.

Figure 10:
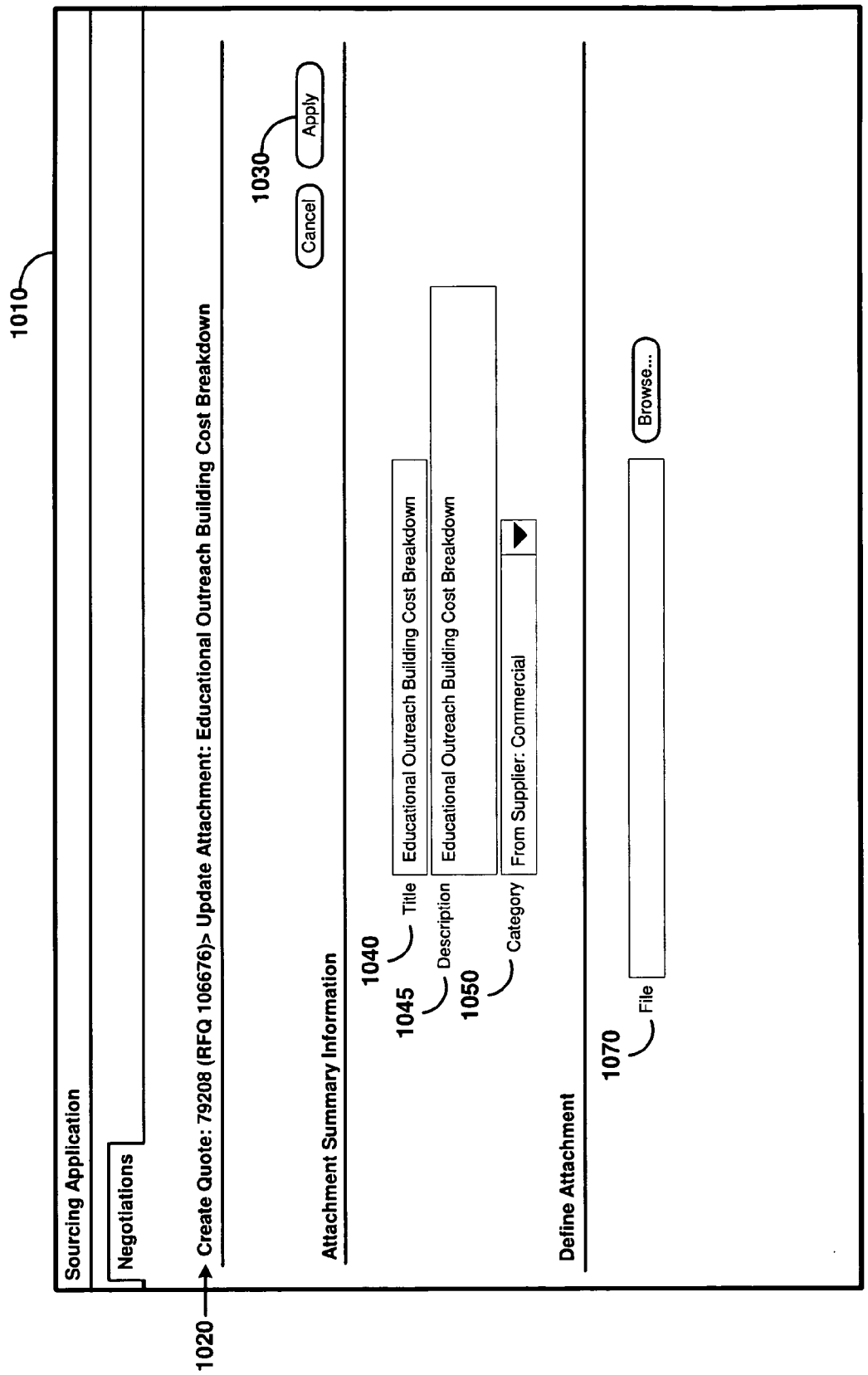
FIG. 10 depicts the manner in which documents corresponding to respective phases are attached to a new quote (by a supplier) in one embodiment.

Each of rows 965-966 depicts the details of a document attached to the new quote such as the title of the document, the type of document (such as "file", "image", etc.), a brief description of the document, the category (that is the phase) to which the document belongs, the details of the person who last updated the document, and the date on which the last update was performed. The category indicates whether the corresponding document is associated with the technical phase or the commercial phase. The category is chosen by the supplier at the time of attaching the document to the quote (as shown in FIG. 10).

Table 970 (in FIG. 9B) depicts the header detail (requirements) of the RFQ corresponding to the details specified by the buyer using the interface depicted in FIGS. 3B and 3C.

Columns 971-973 respectively indicate the title, the RFQ stage/phase, the target value/price associated with each requirement. Column 974 ("Quote Value") contains a text box enabling the supplier to specify a desired quote value for the corresponding requirement.

Each of rows 981-985 specifies the details of a requirement of the RFQ (and corresponds to respective rows 381-385 of FIG. 3B). It may be observed that rows 982-985 are indicated to be belonging to the technical phase.

Though not shown, it may be appreciated that the details of the other requirements and lines specified in the RFQ with identifier 106676 may be displayed using an interface similar to FIG. 9B, thereby enabling the supplier to provide desired quote values corresponding to the requirements/lines. It may be further appreciated that the phase/stage associated with the requirements/lines are fixed by the buyer and the supplier does not have facility to change the corresponding phases.

Such a feature may be desirable at least in a scenario when a supplier needs to include specific information corresponding to a specific phase. In one embodiment, the supplier is provided the facility of attaching documents (as shown in table 960) to respective phases in the new quote as described in detail below.

FIG. 10 depicts the manner in which documents corresponding to respective phases are attached to a new quote (by a supplier) in one embodiment. Display area 1010 enables a supplier to update the details of a document titled "Educational Outreach building Cost Breakdown" attached to the new quote with identifier 79208 created in response to the RFQ identified by the unique identifier 106676 (as indicated in text 1020). Display area 1010 may be displayed when the supplier selects the update icon in row 966 of table 960 in FIG. 9A.

Fields 1040 and 1045 enables a supplier to specify the title and description associated with the attachment. Select field 1050 (labeled "Category") enables the supplier to select the specific phase/stage (from the list of phases/stages specified in the RFQ) to be associated with the document. The value of "From Supplier: Commercial" of select field 1050 indicates that the current attachment is associated with the commercial phase of the two-phase RFQ and the association is specified by the supplier (in contrast to the header/line detail which is specified by the buyer).

Field 1070 enables the supplier to specify a document to be specified as the attachment. Button 1030 enables the information specified in FIG. 1010 to be stored and the control to be passed to the display depicted in display area 910. It may be appreciated that on clicking button 1030, the document specified in field 1070 may be copied/transferred from one of supplier systems 110A-110C (used by the supplier for creating the new quote) to server system 160.

Thus, a supplier may specify information corresponding to specific phases by attaching the desired documents to the new quote and by indicating the corresponding phases associated with each of the attached documents. The supplier after attaching the desired documents and specifying the quote values associated with the requirements/lines of the RFQ in the new quote may review and submit the newly created quote as described in detail below.

11. Reviewing and Submitting a Quote

FIG. 11 depicts the manner in which a quote is reviewed and submitted (by a supplier) in one embodiment. Display area 1110 enables a supplier to review and submit the newly created quote identified by the unique number 79208 which is created in response to the RFQ with identifier 106676 (as indicated by text 1120).

Text 1115 indicates that the newly created quote is being created in response to an RFQ where the submitted quote will be evaluated in two stages/phases, namely, "Technical" and "Commercial".

Button 1130 enables a supplier to validate the details of the newly created quote, that is, verify whether the information provided in the newly created quote is consistent with business rules for specifying quotes enforced by bidding manager 150. Button 1140 displays the format in which a printed copy of the newly created quote will be generated. Button 1135 enables the supplier to save a draft version of the quote.

Display area 1160 depicts the details of the newly created quote (including the information specified by the supplier using the interface depicted in display area 910). In a scenario that a supplier determines that the information depicted in display area 1160 is not accurate, the supplier may use the interface depicted in display area 910 to make the appropriate changes to the information.

Button 1180 enables the supplier to send the reviewed quote for submission, wherein, an information packet corresponding to the newly created quote containing the quote values corresponding to the header/line detail, the attached documents and other information specified by the supplier as described above is sent to bidding manager 150.

Similarly, bidding manager 150 may receive other information packets (quotes) from other suppliers in response to the two-phase RFQ. It may be appreciated that the header/line detail, the attached documents etc. contained in the information packets represents the information elements associated with the respective phases.

Thus, after receiving quotes (electronically, paper-based or surrogate) in response to a RFQ, a buyer may decide to start evaluation of the received quotes, typically after receiving quotes from a selected set of suppliers or after the close date. Accordingly, the description is continued illustrating the manner in which evaluation is performed in a technical phase of a two-phase RFQ in one embodiment.

12. Evaluating the Technical Phase of a Two-Phase RFQ

FIGS. 12, 13, 14A-14B and 15 together illustrates the manner in which a technical phase of a two-phase RFQ is evaluated in one embodiment. Each of the Figures is described in detail below.

FIG. 12 depicts the manner in which an indication that a technical phase of a two-phase RFQ is to be accessed for evaluation is indicated (by a buyer) in one embodiment. Display area 1210 enables a buyer to unlock (and thereby access) the technical phase/stage of a two-phase RFQ identified by the unique identifier 106676 (as indicated by text 1220).

Display area 1230 depicts various details of the RFQ including the title "Educational Outreach Building", the status and the close date "30 Sep. 2007 00:00:00" of the RFQ. The status of the RFQ is indicated to be "Closed (Locked)" specifying that no further quotes (except surrogate quotes) in response to the RFQ are allowed and that the RFQ is ready for evaluation.

Display area 1270 is similar to display area 760 (of FIG. 7) displaying different portions of the two-phase RFQ based on the tab selected. Display area 1270 is shown depicting the header detail of the two-phase RFQ corresponding to the selection of the tab labeled "Header". It may be observed that the information is similar to that specified in display area 310.

Select field 1250 and button 1255 together enables the buyer to perform one of a pre-defined set of actions. As such, a buyer may select the action "Unlock Stage: Technical" in select field 1250 and then click on button 1255 to cause the performance of the corresponding action, that is, send an indication to bidding manager 150 that the technical phase of the specific RFQ (with identifier 106676) is to be accessed for commencing evaluation.

In response to receiving the above indication, bidding manager 150 allows access to the information contained in the quotes received in response to the specific RFQ. In one embodiment, bidding manager 150 first displays a list of quotes received as described in detail below.

FIG. 13 depicts the manner in which quotes received in response to a specific two-phase RFQ is accessed (by a buyer) in one embodiment. Display area 1310 enables a buyer to view the list of quotes received in response to a two-phase RFQ identified by the identifier 106676 (as indicated by text 1320). Text 1330 indicates the title "Educational Outreach Building" of the RFQ, while text 1350 (labeled "Status") indicates that the evaluation of the technical stage of the RFQ is in progress.

Table 1360 depicts the various quotes received in response to the RFQ. Column 1371 enables the buyer to select the desired quotes by selecting the corresponding check boxes and to perform various actions (as depicted in display areas 1365) such as comparing the quote values corresponding to the requirements, changing the shortlist status etc. with the selected quotes.

Columns 1372-1377 respectively indicate name of the supplier, the supplier site, the name of the (primary) contact, the quote number/identifier, the total agreement amount, and the score corresponding to each quote. It may be appreciated that the values in column 1376 corresponding to the total amount is not displayed since the technical phase/stage is being currently accessed.

Column 1378 contains an icon indicating the shortlist status of a corresponding supplier with a tick icon indicating that the corresponding supplier has been supplied and a stop icon (not shown) indicating otherwise.

Each of rows 1381-1383 specifies the details of a quote received in response to a RFQ. In particular, row 1381 specifies a quote received from the supplier "Gingers" having "Kim, Helen" as the contact, identified by the unique identifier 79208 and shortlisted for the next phase (as indicated by the tick icon). Similarly, rows 1382 and 1383 specify the details of other quotes received from other suppliers in response to the RFQ.

It may be appreciated that the quote depicted in row 1381 corresponds to the quote created by a supplier using the interfaces depicted in FIGS. 9A-9B as described in detail above. A buyer may then view the details of the quote by selecting the link associated with the name of the supplier (column 1372) as described in detail below.

13. Viewing Information Associated to Technical Phase

FIGS. 14A-14B illustrate the manner in which quote information associated with the technical phase is viewed (by a buyer) in one embodiment. Display area 1410 enables a buyer to view the information associated with the technical phase contained in a quote with identifier 79208 received in response to a RFQ with identifier 106676 (as indicated by text 1420).

Display area 1425 depicts the various details contained in the quote and the corresponding RFQ. It may be observed that the detail depicted in display area 1425 corresponds to the information provided by a supplier when creating the quote using the interface depicted in FIGS. 9A-9B.

Table 1430 depicts the various attachments (generally in the form of documents) received along with the quote. It may be observed that only the attachments associated with the technical phase (as indicated by the supplier using the interface provided in FIG. 10) are included in table 1430. It may be observed that the attachments shown in table 1430 are header attachments associated with the details provided in the header of the quote. Line attachments are associated with the lines of the quote as shown in FIG. 14B below.

Tables 1450 and 1460 (in FIG. 14B) respectively depicts the header/line detail of the specific quote provided by the supplier in response to the RFQ. In particular, each of rows 1481-1485 specifies the details of a line and any corresponding attachments provided by the supplier (as depicted by the respective attachments table in rows 1481-1483).

It may be observed that only the requirements (header detail) corresponding to the technical phase is depicted in table 1450. Similarly, in table 1460, the price information (quote value) provided by the suppliers corresponding to the columns "Estimated Total Amount" and "Target Minimum Release Amount" are not displayed since the technical phase is being currently evaluated.

The buyer evaluates the technical aspects of the quote based on the header/line information (and the corresponding attachments) provided by the supplier. In one embodiment, a technical evaluation team evaluates the quotes received and then assigns a score to each of the header/line detail as described in detail below.

FIG. 15 illustrates the manner in which quote information associated with the technical phase is scored/evaluated (by a buyer) in one embodiment. Display area 1510 enables a buyer to specify scores corresponding to the header/line detail contained in quote with identifier 79208 in response to the RFQ with identifier 106676 (as indicated by text 1520).

Table 1530 depicts the line details of the specific quote being evaluated. Rows 1551 and 1553 correspond to lines associated with the technical phase and as such enable scoring to be specified in the text fields (such as 1560) provided in the column "Score". The buyer (or a member of the technical evaluation team) may also post notes in the text fields (such as 1570) provided in the column "Internal Note". It may be observed that row 1552 associated with the commercial phase does not contain any text fields for specifying the corresponding score and note.

Thus, the buyer specifies the individual scores associated with the header/line detail and other information specified in the quote (not shown). Based on the scores assigned during evaluation (and the corresponding weights specified in the RFQ), bidding manager 150 may then determine and display a total score corresponding to each quote (supplier).

The buyer may then shortlist a set of suppliers based on the total score and other factors (such as the location of the supplier, the previous track record etc.) and indicate the status corresponding to each supplier using the "Change Shortlist Status" button in FIG. 13. After short-listing the desired set of suppliers, the buyer may proceed with the evaluation of the commercial phase/stage as described below with examples.

14. Evaluating the Commercial Phase of a Two-Phase RFQ

FIGS. 16A-16D, 17, 18A-18B and 19 together illustrate the manner in which a commercial phase of a two-phase RFQ is evaluated in one embodiment. Each of the Figures is described in detail below.

FIGS. 16A-16D together depict the manner in which an indication that the technical phase of a two-phase RFQ is complete and that the commercial phase is to be accessed is indicated (by a buyer) in one embodiment.

Display area 1610 (in FIG. 16A) enables a buyer to indicate the completion of evaluation of the technical phase/stage of a two-phase RFQ identified by the unique identifier 106676 (as indicated by text 1620). Display area 1625 depicts various details of the RFQ including the status as "Evaluation in Progress: Technical" indicating that the technical stage/phase is currently being evaluated.

A buyer may select the action "Complete Evaluation: Technical" in select field 1630 and then click on button 1635 to cause an indication to be sent to bidding manager 150 indicating the completion of evaluation of the technical phase. In response to such an indication, bidding manager 150 may display an interface as depicted in display area 1610 (in FIG. 16B) enabling a buyer to confirm that the technical evaluation of RFQ 106676 is complete (as indicated by text 1640).

Display area 1645 indicates that the quotes excluded from the short list (that is the quotes/suppliers not short listed and disqualified suppliers) will not be available for the commercial evaluation. As described above, the information related to suppliers not included in the short list are not accessible in any of the subsequent stages either to the buyer or to the suppliers. Further, a checkbox is provided for sharing the technical evaluation results with the suppliers immediately. The buyer may then select/click button 1650 to confirm completion.

It may be desirable that the buyer be enabled to undo the completion of the technical phase of the two-phase RFQ. Display area 1610 (in FIG. 16C) enables a buyer to undo the completion of the technical phase/stage of a two-phase RFQ identified by the unique identifier 106676 (as indicated by text 1660). Display area 1665 depicts various details of the RFQ including the status as "Evaluation Complete: Technical" indicating that the technical stage/phase is completed.

A buyer may select the action "Undo Complete Evaluation: Technical" in select field 1670 and then click on button 1675 to cause an indication to be sent to bidding manager 150 indicating that the buyer desiring undoing of the completion of evaluation of the technical phase. In response, bidding manager 150 may enable the buyer access to the information elements related to the technical phase and reevaluation of the bids in that phase (for example, to indicate a different set of shortlisted suppliers).

After completing evaluation of the technical phase, the buyer may desire commencement of the commercial stage. Bidding manager 150 may display an interface as depicted in display area 1610 (in FIG. 16D) enabling a buyer to unlock (and thereby access) the commercial stage of a two-phase RFQ identified by the identifier 106676 (as indicated in text 1680). Display area 1685 depicts various details of the RFQ including the status as "Evaluation Complete: Technical" indicating that the technical stage/phase is completed.

A buyer may select the action "Unlock Stage: Commercial" in select field 1690 and then click on button 1695 to cause an indication to be sent to bidding manager 150 indicating that the commercial phase is to be accessed.

Thus, the above-described indications (sent when buttons 1635, 1650, and 1695 are clicked/selected) together forms the indication that the technical phase of a two-phase RFQ is complete and that the commercial phase of the RFQ is to be accessed. In response to receiving such an indication, bidding manager 150 displays a list of quotes corresponding to suppliers shortlisted in the technical phase as described in detail below.

FIG. 17 depicts the manner in which quotes shortlisted after the completion of the technical phase is accessed (by a buyer) in one embodiment. It may be appreciated that paper-based quotes received prior to commencement of the technical phase may be evaluated offline (without being input to bidding manager 150), with the shortlisted paper-based quotes being input as surrogate quotes directly for the commercial phase. Accordingly, the description is continued assuming that quotes shortlisted after the completion of the technical phase included such paper-based quotes input as surrogate quotes directly for the commercial phase Display area 1710 enables a buyer to view the list of quotes shortlisted in a technical phase of a two-phase RFQ identified by the identifier 106676 (as indicated by text 1720). Text 1730 indicates the title "Educational Outreach Building" of the RFQ, while text 1740 (labeled "Status") indicates that the evaluation of the commercial stage of the RFQ is in progress.

Table 1750 depicts the quotes received in response to the RFQ. Column 1761 enables the buyer to select the desired quotes by selecting the corresponding check boxes and to perform various actions (as depicted in display area 1755) such as comparing the quote values corresponding to the requirements, changing the shortlist status, awarding a single/multiple suppliers (that is, selecting the winning suppliers) etc. with the selected quotes.

Columns 1762-1769 respectively indicate name of the supplier, the supplier site, the name of the (primary) contact, the quote number/identifier, the quote total in the quoted currency, the quoted total in a fixed currency (dollars as indicated by the "USD"), the total amount that is awarded, and the score corresponding to each quote. It may be appreciated that the values in column 1766-1768 are displayed since the commercial phase/stage is being currently accessed. Column 1770 contains an icon indicating the shortlist status of a corresponding supplier with a tick icon indicating that the corresponding supplier has been shortlisted and a stop icon indicating otherwise.

Each of rows 1781-1783 specifies the details of a quote received in response to a RFQ. It may be observed that the quotes depicted in rows 1781 and 1782 are shown to be shortlisted (by the tick icon in column 1770) while the quote in row 1783 is shown not to be shortlisted (by the stop icon in column 1770). Accordingly, all the commercial details in row 1783 are shown as "Sealed", thereby indicating that the information corresponding to the supplier "B&T Constructions" is not accessible in any of the subsequent phases.

It may be observed that the quote in row 1782 corresponds to the quote depicted in row 1381 (in FIG. 13) after being short-listed based on the technical evaluation. A buyer may then view the details of the quote by selecting the link associated with the name of the supplier (column 1762) as described in detail below.

15. Viewing Information Associated to Commercial Phase

FIGS. 18A-18B together illustrate the manner in which quote information associated with the commercial phase is viewed (by a buyer) in one embodiment. Display area 1810 enables a buyer to view the information associated with the commercial phase contained in a quote with identifier 79208 received in response to a RFQ with identifier 106676 (as indicated by text 1820).

Display area 1825 depicts the various details contained in the quote and the corresponding RFQ. It may be observed that the detail depicted in display area 1825 corresponds to the information provided by a supplier when creating the quote using the interface depicted in FIGS. 9A-9B.

Table 1830 depicts the various attachments (generally in the form of documents) received sent along with the quote. It may be observed that all the attachments associated with either the technical phase or the commercial phase (as indicated by the supplier using the interface provided in FIG. 10) are included in table 1830, in contrast to table 1430 where only the attachments associated with the technical phase was displayed.

Tables 1850 and 1860 (in FIG. 14B) respectively depict the header/line detail of the specific quote provided by the supplier in response to the RFQ. In particular, each of rows 1881-1886 specifies the details of a line, any corresponding attachments provided by the supplier (as depicted by the respective attachments table) and the cost factors associated with each line (as depicted by the respective cost factors table).

It may be observed that all the requirements (both technical and commercial phase) are depicted in table 1850 and that all the information corresponding to both the phases is displayed in table 1860. This is in sharp contrast to corresponding tables 1450 and 1460, where only the information associated with the technical phase was displayed (as described in detail above).

The buyer evaluates the commercial aspects of the quote based on the header/line information (and the corresponding attachments) provided by the supplier. In one embodiment, a scoring team (specified as having access to the commercial sections of the quotes) evaluates the quotes received and then assigns a score to each of the header/line detail as described in detail below.

Figure 19:
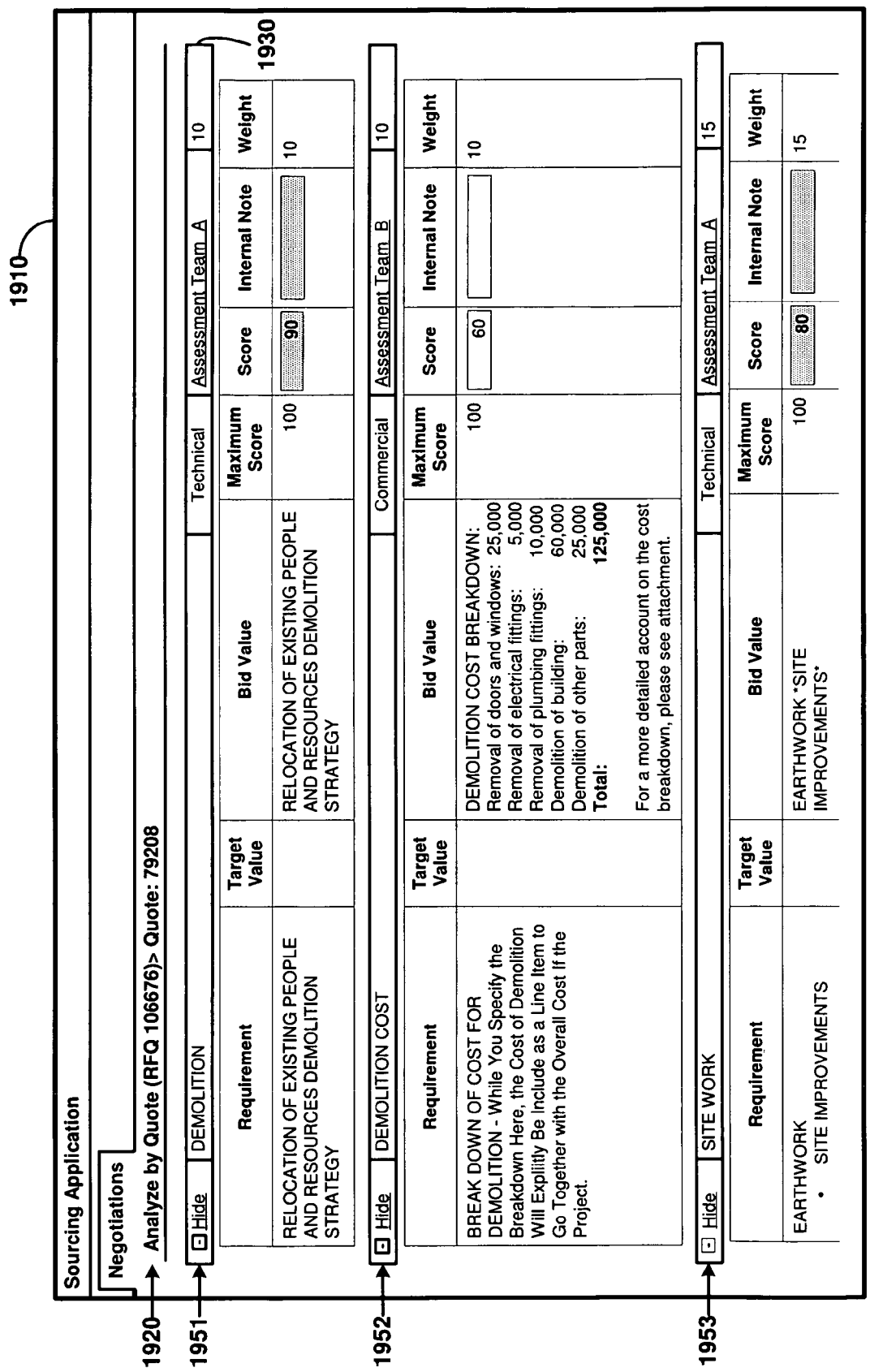
FIG. 19 illustrates the manner in which quote information associated with the commercial phase is scored/evaluated (by a buyer) in one embodiment.

FIG. 19 illustrates the manner in which quote information associated with the commercial phase is scored/evaluated (by a buyer) in one embodiment. Display area 1910 enables a buyer to specify scores corresponding to commercial information included in the header/line detail contained in quote with identifier 79208 in response to the RFQ with identifier 106676 (as indicated by text 1920).

Table 1930 depicts the line details of the specific quote being evaluated (and is similar to table 1530). Rows 1951 and 1953 correspond to lines associated with the technical phase and as such display the scores assigned during the evaluation of the technical phase. It may be observed that the scores and the corresponding notes are shown as being non-modifiable (indicated by the dotted area). It may be further observed that row 1952 associated with the commercial phase displays the bid value and contains text fields for specifying the corresponding score and note, in sharp contrast to row 1552 where the text fields were absent.

Thus, the buyer specifies the individual scores associated with the commercial information included on the header/line detail and other information specified in the quote (not shown). Based on the scores assigned during the commercial evaluation (and the corresponding weights specified in the RFQ), bidding manager 150 may then determine and display a total score corresponding to each quote (supplier) for the commercial phase.

Bidding manager 150 may also calculate and display a cumulative score of the total scores obtained corresponding to each of the phases. The buyer may then award/select the winning suppliers based on the cumulative scores.

Thus, bidding manager 150 facilitates multi-phase electronic bid evaluation to be conducted. It may be appreciated that though the features of the present invention are described above with respect to a two-phase bid evaluation, the approach can be extended to multiple phases as well as other types/forms of bidding, as will be apparent to one skilled in the relevant arts by reading the disclosure provided herein.

Similarly, though bidding manager 150 is shown as providing appropriate interfaces to buyers and suppliers for creating request for bids and corresponding bids in response, in alternative embodiments, individual applications may be provided in buyer system 130 and each of supplier systems 110A-110C for creating and sending request for bids and/or bids to bidding manager 150.

It should be appreciated that the features described above can be implemented in various embodiments as a desired combination of one or more of hardware, software and firmware. The description is continued with respect to an embodiment in which various features are operative when software instructions are executed.

16. Digital Processing System

Figure 20:
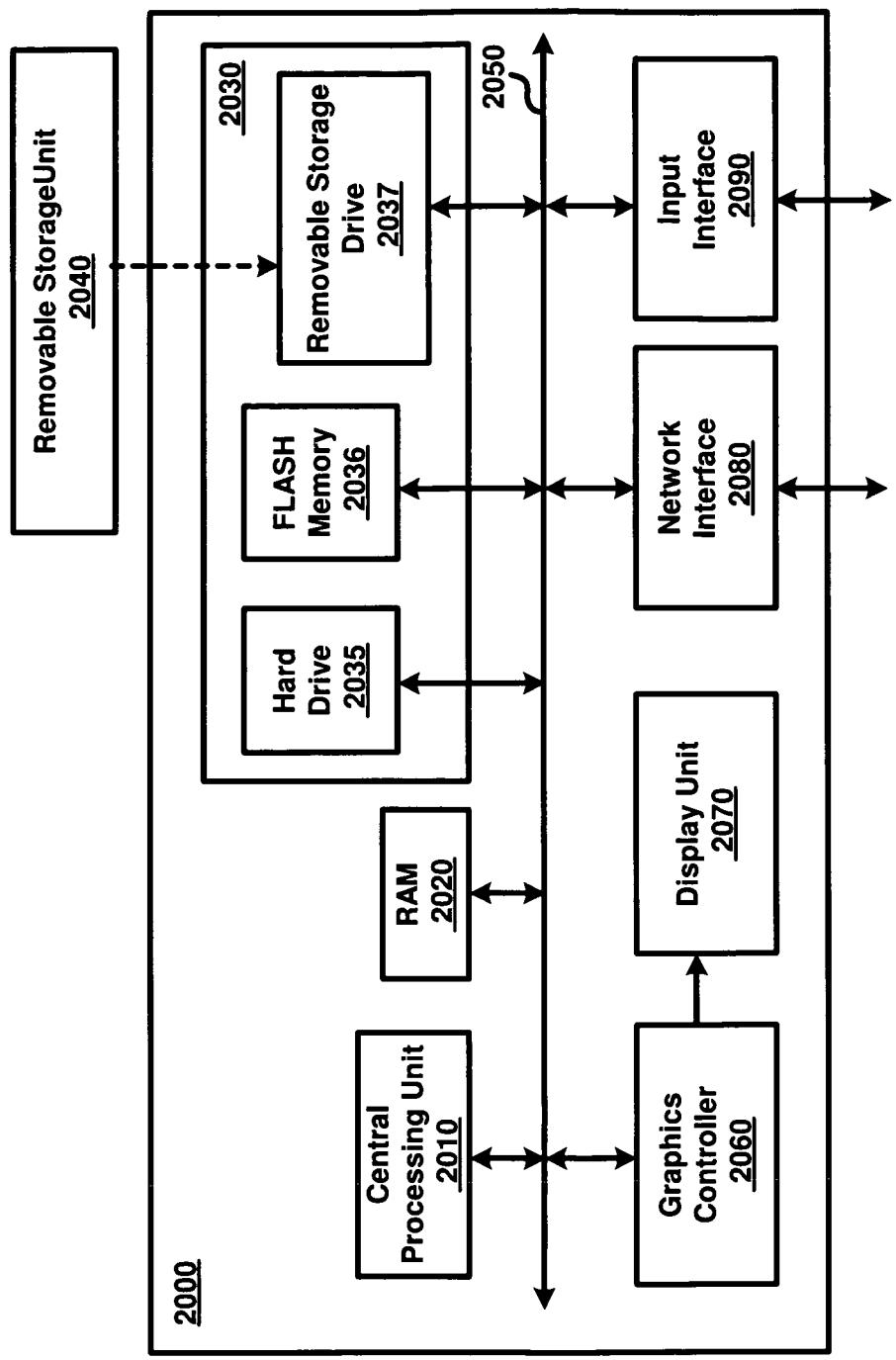
FIG. 20 is a block diagram illustrating the details of a digital processing system in which various aspects of the present invention are operative by execution of appropriate software instructions.

FIG. 20 is a block diagram illustrating the details of digital processing system 2000 in which various aspects of the present invention are operative by execution of appropriate software instructions. Digital processing system 2000 may correspond to server system 160 (executing bidding manager 150) or any system using which a buyer/supplier accesses bidding manager 150.

Digital processing system 2000 may contain one or more processors (such as a central processing unit (CPU) 2010), random access memory (RAM) 2020, secondary memory 2030, graphics controller 2060, display unit 2070, network interface 2080, and input interface 2090. All the components except display unit 2070 may communicate with each other over communication path 2050, which may contain several buses as is well known in the relevant arts. The components of FIG. 20 are described below in further detail.

CPU 2010 may execute instructions stored in RAM 2020 to provide several features of the present invention. CPU 2010 may contain multiple processing units, with each processing unit potentially being designed for a specific task. Alternatively, CPU 2010 may contain only a single general-purpose processing unit. RAM 2020 may receive instructions from secondary memory 2030 using communication path 2050.

Graphics controller 2060 generates display signals (e.g., in RGB format) to display unit 2070 based on data/instructions received from CPU 2010. Display unit 2070 contains a display screen to display the images defined by the display signals. Input interface 2090 may correspond to a keyboard and a pointing device (e.g., touch-pad, mouse). Network interface 2080 provides connectivity to a network (e.g., using Internet Protocol), and may be used to communicate with other connected systems (such as supplier systems 11A-110C or buyer system 130) of FIG. 1.

Secondary memory 2030 may contain hard drive 2035, flash memory 2036, and removable storage drive 2037. Secondary memory 2030 may store the data and software instructions, which enable digital processing system 2000 to provide several features in accordance with the present invention.

Some or all of the data and instructions may be provided on removable storage unit 2040, and the data and instructions may be read and provided by removable storage drive 2037 to CPU 2010. Floppy drive, magnetic tape drive, CD-ROM drive, DVD Drive, Flash memory, removable memory chip (PCMCIA Card, EPROM) are examples of such removable storage drive 2037.

Removable storage unit 2040 may be implemented using medium and storage format compatible with removable storage drive 2037 such that removable storage drive 2037 can read the data and instructions. Thus, removable storage unit 2040 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 2040 or hard disk installed in hard drive 2035. These computer program products are means for providing software to digital processing system 2000. CPU 2010 may retrieve the software instructions, and execute the instructions to provide various features of the present invention described above.

17. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A computer implemented method facilitating a multi-phase evaluation for a bidding between a buyer and a plurality of suppliers, said method comprising:

receiving a plurality of information packets in a digital processing system, wherein each information packet is received from a corresponding one of said plurality of suppliers as a bid, wherein each of said plurality of information packets contains information elements associated with corresponding one of a sequence of phases as a part of said bidding for said goods or services;

storing said plurality of information elements in a non-volatile storage of a data store;

evaluating, by a server, sequentially each of said sequence of phases for said goods or services by examining said plurality of information packets received in said digital processing system, wherein only suppliers qualifying successfully in one phase are evaluated in a subsequent phase in said sequence of phases, wherein all of said plurality of information packets corresponding to all of said sequence of phases are received before start of said evaluating of a first phase of said sequence of phases;

receiving in said digital processing system an indication indicating that a specific phase of said bidding is to be evaluated starting at a time instance' wherein said specific phase follows a previous phase in an order specified in said sequence of phases and wherein said previous phase and said specific phase are contained in said sequence of phases;

allowing to said buyer access of information elements associated with said specific phase only after said time instance such that access to information elements associated with said specific phase is denied before said time instance, said allowing to allow access of information elements associated with said previous phase before said time instance, said allowing being performed in said digital processing system.

2. The method of claim 1, further comprising:

receiving a data specifying a set of suppliers contained in said plurality of suppliers who have successfully qualified in said previous phase, wherein said allowing allows access of information elements associated with said specific phase corresponding only to said set of suppliers in response to said indication.

3. The method of claim 2, wherein said allowing does not allow access of information elements associated with all of said sequence of phases starting with said specific phase corresponding to suppliers other than said set of suppliers.

4. The method of claim 1, further comprising:

receiving a request data from said buyer specifying that said bidding is to be conducted in said sequence of phases; and sending a request indication to each of said plurality of suppliers indicating that said bidding is being conducted, wherein said receiving receives said plurality of information packets from said plurality of suppliers in response to said request indication.

5. The method of claim 4, wherein said request data specifies a specific set of suppliers for said bidding, wherein said sending sends said request indication for said bidding to each of said specific set of suppliers only.

6. The method of claim 4, wherein said request data specifies the information to be contained in each information element provided by each supplier, wherein said request data further indicates the corresponding one of said sequence of phases associated with each information element.

7. The method of claim 1, wherein a first information packet contained in said plurality of information packets is received from a first supplier contained in said plurality of suppliers, said method further comprising:

enabling said first supplier to provide a plurality of attachments in said first information packet, wherein each of said plurality of attachments is associated with a corresponding one of said sequence of phases, wherein said allowing allows access only to attachments associated with said specific phase in response to said indication.

8. A non-transitory machine readable medium storing one or more sequences of instructions for causing a system to facilitate a multi-phase evaluation for a bidding between a buyer and a plurality of suppliers for a goods or services, wherein execution of said one or more sequences of instructions by one or more processors contained in said system causes said system to perform the actions of:

receiving a plurality of information packets, wherein each information packet is received from a corresponding one of said plurality of suppliers as a bid, wherein each of said plurality of information packets contains information elements associated with corresponding one of a sequence of phases as part of said bidding for said goods or services;

evaluating sequentially each of said sequence of phases for said goods or services by examining said plurality of information packets received in said system, wherein only suppliers qualifying successfully in one phase are evaluated in a subsequent phase in said sequence of phases, wherein all of said plurality of information packets corresponding to all of said sequence of phases are received before start of said evaluating of a first phase of said sequence of phase;

receiving a first indication indicating that a specific phase of said bidding is to be evaluated, wherein said specific phase is contained in said sequence of phases;

allowing to said buyer access of information elements only associated with said specific phase in response to said first indication such that access to said information elements associated with a specific phase is denied before receiving said first indication;

receiving a second indication indicating that evaluation of said specific phase is complete and that the evaluation of a later phase is to be commenced, wherein said later phase is also contained in said sequence of phases and follows said specific phase in an order specified in said sequence of phases; and allowing to said buyer access of information elements associated with said later phase in response to said second indication such that access to said information elements associated with said later phase is denied before receiving said second indication.

9. The machine readable medium of claim 8, wherein said second indication further indicates that only a specific set of suppliers contained in said plurality of suppliers have successfully qualified in said specific phase, wherein said allowing allows access of information elements associated with said later phase corresponding only to said specific set of suppliers in response to said second indication.

10. The machine readable medium of claim 9, wherein said allowing does not allow access of information elements associated with all of said sequence of phases starting with said specific phase corresponding to suppliers other than said specific set of suppliers.

11. The machine readable medium of claim 8, further comprising one or more instructions for:

receiving a request data from said buyer specifying that said bidding is to be conducted in said sequence of phases; and sending a request indication to each of said plurality of suppliers indicating that said bidding is being conducted, wherein said receiving receives said plurality of information packets from said plurality of suppliers in response to said request indication.

12. The machine readable medium of claim 11, wherein said request data further specifies a specific set of suppliers for said bidding, wherein said sending sends said request indication for said bidding to each of said specific set of suppliers only.

13. The machine readable medium of claim 11, wherein said request data specifies the information to be contained in each information element provided by each supplier, wherein said request data further indicates the corresponding one of said sequence of phases associated with each information element.

14. The machine readable medium of claim 8, wherein a first information packet contained in said plurality of information packets is received from a first supplier contained in said plurality of suppliers, further comprising one or more instructions for:

receiving a plurality of attachments contained in said first information packet, wherein each of said plurality of attachments is associated with a corresponding one of said sequence of phases, wherein said allowing allows access only to attachments associated with said specific phase in response to said first indication.

15. The machine readable medium of claim 8, wherein each of said sequence of phases is uniquely identified using one of a pre-defined set of names, further comprising one of more instructions for:

receiving a user-defined set of names corresponding to said sequence of phases from said buyer, wherein each of said user-defined set of names is used to uniquely identify corresponding one of said sequence of phases in place of a corresponding one of said pre-defined set of names.

16. The machine readable medium of claim 8, wherein said second indication comprises a third indication and a fourth indication, wherein said third indication indicates that evaluation of said specific phase is complete and said fourth indication indicates that the evaluation of said later phase is to be commenced, wherein said buyer is provided the ability to revert back to said specific phase before providing said fourth indication.

17. The machine readable medium of claim 8, wherein said sequence of phases comprise only a technical phase and a commercial phase in that order, whereby said technical phase corresponds to said specific phase and said commercial phase corresponds to said later phase, wherein said buyer is allowed access to only information elements corresponding to said technical phase upon receiving said first indication and to those corresponding to said commercial phase also upon receiving said second indication, whereby said buyer is not allowed access of information elements corresponding to said technical phase before receipt of said first indication to those corresponding to said commercial phase before receipt of said second indication.

18. A computing system comprising:

a buyer system enabling a buyer to send a request data specifying that the evaluation of a bidding for a goods or services is to be conducted in a sequence of phases;

a plurality of suppliers systems enabling a plurality of suppliers to send a corresponding one of a plurality of information packets as a bid in response to said bidding for said goods or services, wherein each of said plurality of information packets contains specific information elements associated with corresponding one of said sequence of phases to bid for said goods or services;

a data store to maintain said plurality of information packets received from said plurality of suppliers; and a bidding manager to facilitate sequential evaluation of each of said sequence of phases for said goods and services by providing access to said plurality of information elements related to the corresponding phase, said bidding manager to allow access to said buyer of information elements only associated with a specific phase in response to a first indication indicating that said specific phase is to be evaluated and to allow access of information elements associated with a later phase in response to a second indication indicating that evaluation of said specific phase is complete and that the evaluation of a later phase is to be commenced, whereby access to information elements related to each phase is denied until corresponding indication of start of evaluation of the phase is received, wherein all of said plurality of information packets are received before start of said evaluating of a first phase of said sequence of phases, wherein said specific phase and said later phase are contained in said sequence of phases and said later phase follows said specific phase in an order specified in said sequence of phases.

19. The computing system of claim 18, wherein said second indication further indicates that only a specific set of suppliers contained in said plurality of suppliers have successfully qualified in said specific phase, wherein said bidding manager allows access of information elements associated with said later phase corresponding only to said specific set of suppliers in response to said second indication.

20. The computing system of claim 19, wherein said bidding manager does not allow access of information elements associated with all of said sequence of phases starting with said specific phase corresponding to suppliers other than said specific set of suppliers.

21. The computing system of claim 18, wherein a first supplier contained in said plurality of suppliers sends a first information packet having a plurality of attachments associated with a corresponding one of said sequence of phases, said first information packet being contained in said plurality of information packets, wherein said data store maintains said plurality of attachments included in said first information packet, wherein said bidding manager allows to said buyer access only to attachments associated with said specific phase in response to said first indication and allows access only to attachments associated with later phase in response to said second indication.

22. The computing system of claim 18, wherein said buyer sends a user-defined set of names corresponding to said sequence of phases, wherein said bidding manager uses respective ones of said user-defined set of names in place of respective one of a pre-defined set of names to uniquely identify each of said sequence of phases.

23. The computing system of claim 18, wherein said second indication comprises a third indication and a fourth indication, wherein said third indication indicates that evaluation of said specific phase is complete and said fourth indication indicates that the evaluation of said later phase is to be commenced, wherein said buyer is provided the ability to revert back to said specific phase before providing said fourth indication.

* * * * *

UNITED STATES PATENT AND TRADEMARK OFFICE
CERTIFICATE OF CORRECTION

PATENT NO. : 8,433,615 B2  
APPLICATION NO. : 12/025774  
DATED : April 30, 2013  
INVENTOR(S) : Bertot et al.

Page 1 of 1

It is certified that error appears in the above-identified patent and that said Letters Patent is hereby corrected as shown below:

In the Claims:

Column 22, line 39, in Claim 1, delete "suppliers," and insert -- suppliers for a goods or services, --, therefor.

Column 22, line 61, in Claim 1, delete "instance'" and insert -- instance, --, therefor.

Column 22, line 67, in Claim 1, after "specific phase" insert -- stored in said data store --.

Column 23, line 62, in Claim 8, delete "as" and insert -- as a --, therefor.

Column 24, line 5, in Claim 8, delete "phase;" and insert -- phases; --, therefor.

Column 24, line 12, in Claim 8, delete "with a" and insert -- with said --, therefor.

Column 26, line 9, in Claim 18, after "packets" insert -- corresponding to all of said sequence of phases --.

Signed and Sealed this  
Third Day of September, 2013

Teresa Stanek Rea  
*Acting Director of the United States Patent and Trademark Office*